under 35 U.S.C. 154(b) by 453 days.

(12) United States Patent
Yokono et al.

(10) Patent No.: US 8,755,594 B2
(45) Date of Patent: Jun. 17, 2014

(54) INFORMATION PROCESSING DEVICE AND METHOD, AND PROGRAM

(75) Inventors: Jun Yokono, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 13/116,412

(22) Filed: May 26, 2011

(65) Prior Publication Data

US 2011/0299731 A1 Dec. 8, 2011

(30) Foreign Application Priority Data

Jun. 4, 2010 (JP) ................................ 2010-129332

(51) Int. Cl.
*G06K 9/00* (2006.01)
(52) U.S. Cl.
USPC ............ 382/159; 382/181; 382/103; 382/160
(58) Field of Classification Search
USPC ................................ 382/159, 181, 103, 160
See application file for complete search history.

(56) References Cited

U.S. PATENT DOCUMENTS

| 7,020,337 | B2 | 3/2006 | Viola et al. |
| 7,099,510 | B2 | 8/2006 | Jones et al. |
| 2002/0102024 | A1 | 8/2002 | Jones et al. |
| 2004/0013304 | A1 | 1/2004 | Viola et al. |
| 2009/0018980 | A1* | 1/2009 | Zhang et al. ................ 706/12 |

* cited by examiner

*Primary Examiner* — Ruiping Li
(74) *Attorney, Agent, or Firm* — Oblon, Spivak, McClelland, Maier & Neustadt, L.L.P.

(57) ABSTRACT

An information processing device includes a first calculation unit which calculates a score of each sample image including a positive image in which an object as an identification object is present and a negative image in which the object as the identification object is not present, for each weak identifier of an identifier including a plurality of weak identifiers, a second calculation unit which calculates the number of scores when the negative image is processed, which are scores less than a minimum score among scores when the positive image is processed; and an realignment unit which realigns the weak identifiers in order from a weak identifier in which the number calculated by the second calculation unit is a maximum.

4 Claims, 19 Drawing Sheets

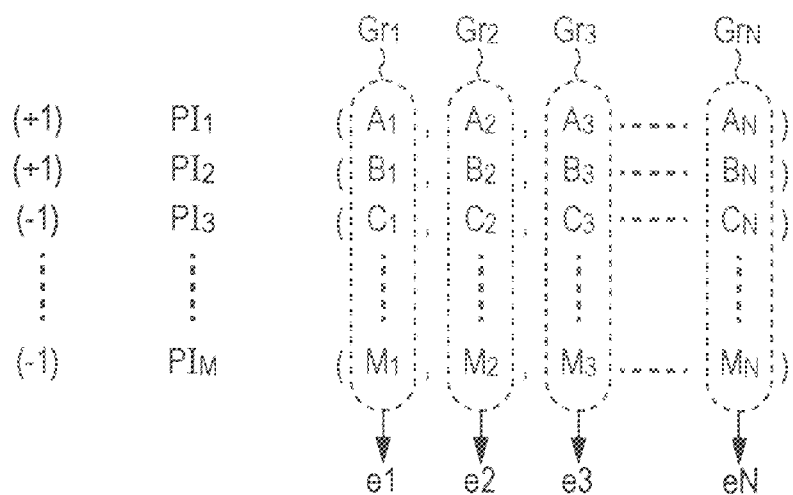

FIG. 18A

PARENT 1 | 2 | 5 | 0 | 3 | 6 | 1 | 4 | 7

PARENT 2 | 3 | 4 | 0 | 7 | 2 | 5 | 1 | 6

FIG. 18B

PARENT 2 | 3 | 4 | 0 | 7 | 2 | 5 | 1 | 6
↓
CHILD 1 | 3 | 4 | * | 7 | 2 | * | * | 6

FIG. 18C

CHILD 1 | 3 | 4 | * | 7 | 2 | * | * | 6
↓
CHILD 1 | 3 | 4 | 5 | 7 | 2 | 0 | 1 | 6

FIG. 18D

PARENT 1 | 2 | 5 | 0 | 3 | 6 | 1 | 4 | 7

PARENT 2 | 3 | 4 | 0 | 7 | 2 | 5 | 1 | 6
↓
CHILD 2 | 2 | 4 | 0 | 3 | 6 | 1 | 5 | 7

INFORMATION PROCESSING DEVICE AND METHOD, AND PROGRAM

BACKGROUND OF THE INVENTION

1. Field of the Invention

The present invention relates to an information processing device and method and a program and, more particularly, to an information processing device and method which is able to more rapidly and more reliably detect a target object from an image, and a program.

2. Description of the Related Art

In the related art, a technique of detecting a person from an image has been mainly researched and developed for security and on-vehicle use. As a main feature amount for detecting (recognizing) a person from an image, a feature amount obtained by edge extraction is used. In such a technique, various variations of a feature amount obtained by edge extraction are defined as new feature amounts so as to recognize a person. In addition, during recognition, a discriminator obtained by statistical learning of boosting may be used as a recognizer (see Paul Viola & Michael Jones US20040013304 A1 System and method for detecting objects in images, Paul Viola & Michael Jones US20020102024 A1 Method and system for object detection in digital images COMPAQ INFORMATION TECHNOLOGIE, Paul Viola & Michael Jones U.S. Pat. No. 7,099,510 B2 Method and system for object detection in digital images HEWLETT PACKARD DEVELOPMENT CO, and Paul Viola & Michael Jones U.S. Pat. No. 7,020,337 B2 System and method for detecting objects in images MITSUBISHI ELECTRIC RES LAB).

SUMMARY OF THE INVENTION

In the related art, in the discriminator obtained by statistical learning of boosting, a weak discriminator had been performing an operation in the learned order. Paul Viola & Michael Jones US20040013304 A1 System and method for detecting objects in images, Paul Viola & Michael Jones US20020102024 A1 Method and system for object detection in digital images COMPAQ INFORMATION TECHNOLOGIE, Paul Viola & Michael Jones U.S. Pat. No. 7,099,510 B2 Method and system for object detection in digital images HEWLETT PACKARD DEVELOPMENT CO, and Paul Viola & Michael Jones U.S. Pat. No. 7,020,337 B2 System and method for detecting objects in images MITSUBISHI ELECTRIC RES LAB, for a high-speed operation propose termination in each cascade stage of boosting. However, increasing high speed is not able to be expected from performing termination.

It is desirable to more accurately and more rapidly detect an object such as a person.

According to an embodiment of the invention, there is provided an information processing device including: first calculation means which calculates a score of each sample image including a positive image in which an object as an identification object is present and a negative image in which the object as the identification object is not present, for each weak identifier of an identifier including a plurality of weak identifiers; second calculation means which calculates the number of scores when the negative image is processed for each weak identifier, which are scores less than a minimum score among scores when the positive image is processed; and realignment means which realigns the weak identifiers in order from a weak identifier in which the number calculated by the second calculation means is a maximum.

According to another embodiment of the invention, there is provided an information processing method including the steps of: calculating a score of each sample image including a positive image in which an object as an identification object is present and a negative image in which the object as the identification object is not present, for each weak identifier of an identifier including a plurality of weak identifiers; calculating the number of scores when the negative image is processed for each weak identifier, which are scores less than a minimum score among scores when the positive image is processed; and realigning the weak identifiers in order from a weak identifier in which the number calculated by the second calculation means is a maximum.

According to another embodiment of the invention, there is provided a computer-readable program for executing a process including the steps of: calculating a score of each sample image including a positive image in which an object as an identification object is present and a negative image in which the object as the identification object is not present, for each weak identifier of an identifier including a plurality of weak identifiers; calculating the number of scores when the negative image is processed, which are scores less than a minimum score among scores when the positive image is processed; and realigning the weak identifiers in order from a weak identifier in which the number calculated by the second calculation means is a maximum.

In the information processing device and method and the program of the embodiment of the invention, a score of each sample image including a positive image in which an object as an identification object is present and a negative image in which the object as the identification object is not present is calculated, for each weak identifier of an identifier including a plurality of weak identifiers, and the weak identifiers are realigned in order from a weak identifier in which the number of scores when the negative image is processed is a maximum, which are scores less than a minimum score among scores when the positive image is processed, thereby generating the identifier.

According to another embodiment of the invention, there is provided an information processing device including: first calculation means which calculates a score of each sample image, for each weak identifier of an identifier including a plurality of weak identifiers; second calculation means which calculates a learning error from the score calculated by the first calculation means; and realignment means which realigns the weak identifiers in order from a weak identifier in which the learning error calculated by the second calculation means is a minimum.

According to another embodiment of the invention, there is provided an information processing method including the steps of: calculating a score of each sample image, for each weak identifier of an identifier including a plurality of weak identifiers; calculating a learning error from the calculated score; and realigning the weak identifiers in order from a weak identifier in which the calculated learning error is a minimum.

According to another embodiment of the invention, there is provided a computer-readable program for executing a process including the steps of: calculating a score of each sample image, for each weak identifier of an identifier including a plurality of weak identifiers; calculating a learning error from the calculated score; and realigning the weak identifiers in order from a weak identifier in which the calculated learning error is a minimum.

In the information processing method and device and the program of the invention, a score of each sample image is calculated, for each weak identifier of an identifier including a plurality of weak identifiers, a learning error is calculated from the calculated score, and the weak identifiers are realigned in order from a weak identifier in which the learning error is a minimum, thereby generating the identifier.

According to another embodiment of the invention, there is provided an information processing device including: calculation means which calculates an average number of weak identifiers when an operation when a sample image is processed is terminated, for each identifier including a plurality of weak identifiers, in which arrangement of the weak identifiers is different; and generation means which generates the identifier in which the average number is minimized by performing an operation based on a genetic algorithm and using the average number calculated by the calculation means when the operation is performed.

According to another embodiment of the invention, there is provided an information processing method including the steps of: calculating an average number of weak identifiers when an operation when a sample image is processed is terminated, for each identifier including a plurality of weak identifiers, in which arrangement of the weak identifiers is different; and generating the identifier in which the average number is minimized by performing an operation based on a genetic algorithm and using the average number when the operation is performed.

According to another embodiment of the invention, there is provided a computer-readable program for executing a process including the steps of: calculating an average number of weak identifiers when an operation when a sample image is processed is terminated, for each identifier including a plurality of weak identifiers, in which arrangement of the weak identifiers is different; and generating the identifier in which the average number is minimized by performing an operation based on a genetic algorithm and using the average number when the operation is performed.

In the information processing device and method and the program of the embodiment of the invention, an average number of weak identifiers when an operation when a sample image is processed is terminated, is calculated for each identifier including a plurality of weak identifiers, in which arrangement of the weak identifiers is different, and the identifier in which the average number is minimized is generated based on a genetic algorithm and the average number.

According to the embodiment of the invention, it is possible to accurately detect an object at a high speed.

BRIEF DESCRIPTION OF THE DRAWINGS

FIG. 10 is a diagram describing sampling of a feature amount for each pair of feature points;

FIG. 11 is a diagram describing setting of a weak identifier;

FIGS. 18A to 18D are a diagram describing crossover;

DESCRIPTION OF THE PREFERRED EMBODIMENTS

Hereinafter, embodiments of the invention will be described with reference to the accompanying drawings.

Regarding to Configuration of System

Figure 1:
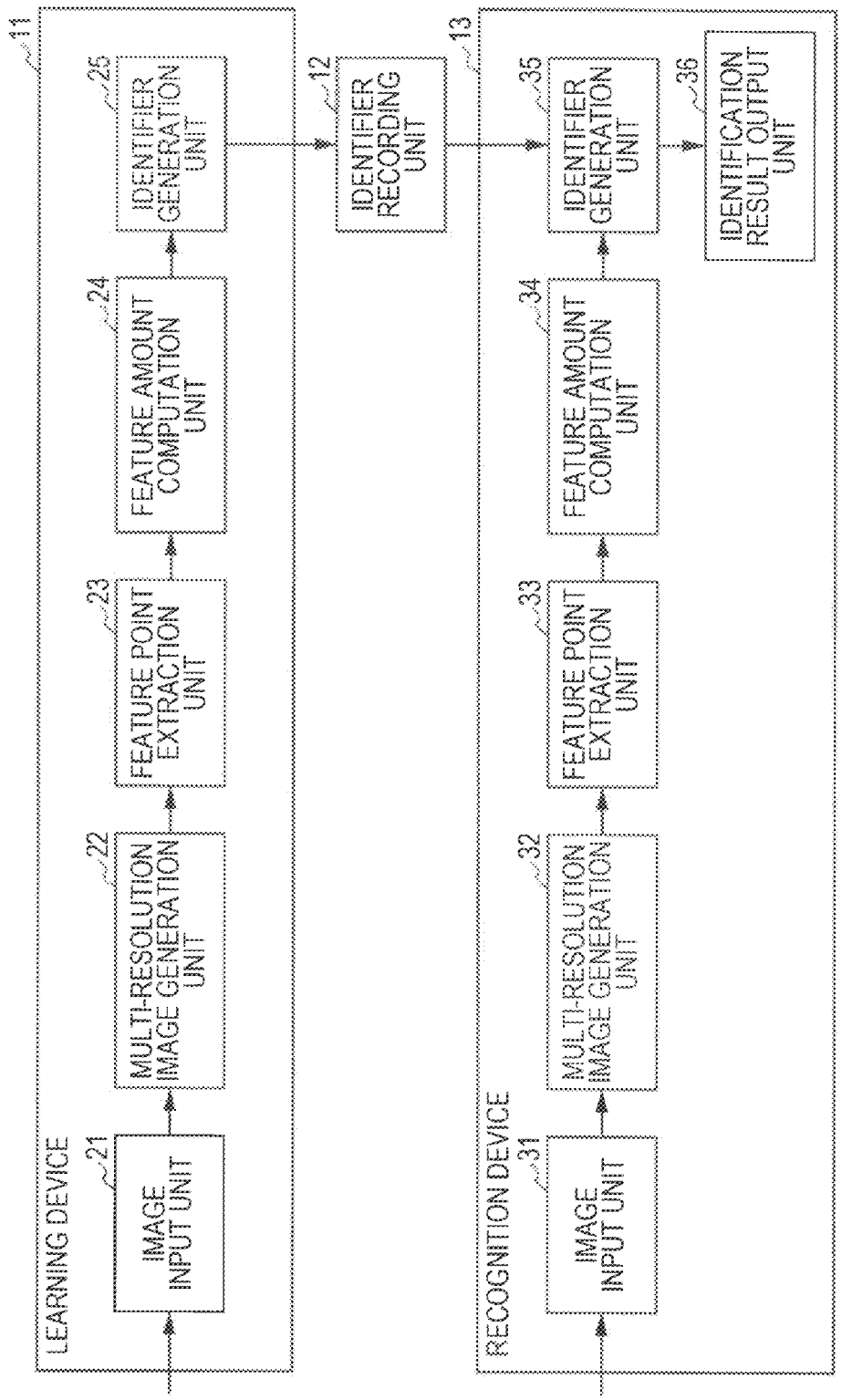
FIG. 1 is a diagram showing the configuration of an identification system according to an embodiment of the invention.

FIG. 1 is a block diagram showing a configuration example of an object identification system according to an embodiment of the invention. The object identification system includes a learning device 11, an identifier recording unit 12, and a recognition device 13 and recognizes a region, in which, for example, an image of a person is present as a target object, in an input image.

The learning device 11 generates an identifier used when performing a process of identifying presence or absence of a target object on an image in the recognition device 13 and records the identifier in the identifier recording unit 12, based on an input learning image. The recognition device 13 identifies whether or not an image of a target object is present in the input image using an identification feature amount and an identifier recorded in the identifier recording unit 12 and outputs the identified result.

The learning device 11 includes an image input unit 21, a multi-resolution image generation unit 22, a feature point extraction unit 23, a feature amount computation unit 24, and an identifier generation unit 25.

The multi-resolution image generation unit 22 generates a plurality of images having different resolutions from the learning image input by the image input unit 21 and supplies such images to the feature point extraction unit 23 as multi-resolution images. For example, multi-resolution images of layers of eight resolutions from a level L1 to a level L8 are generated. Here, the resolution of the multi-resolution image of the level L1 is highest and the resolutions of the multi-resolution images are sequentially decreased from the level L1 to the level L8.

The feature point extraction unit 23 extracts feature points used when generating the identifier for identifying presence or absence of some of the pixels of the learning image from each image (learning image) configuring the multi-resolution images generated by the multi-resolution image generation unit 22 and supplies the extracted feature points and the learning image to the feature amount computation unit 24. Here, the identifier is a strong identifier including a plurality of weak identifiers generated by statistical learning and is used, for example, in the case of identifying whether or not a region of an image of an object is present in an input image using the contour of the object.

The feature amount computation unit 24 computes a feature amount indicating the extracted contour for each feature point by a filter process, for example, using a steerable filter based on the learning image from the feature point extraction unit 23 and supplies the obtained feature amount and the learning image to the identifier generation unit 25. The identifier generation unit 25 performs, for example, a statistical learning process by Adaboost based on the learning image and the feature amount supplied from the feature amount computation unit 24 and generates an identifier for identifying, for example, a person who is a target object. The identifier generation unit 25 supplies the generated identifier to the identifier recording unit 12.

The recognition device 13 includes an input image unit 31, a multi-resolution image generation unit 32, a feature point extraction unit 33, a feature amount computation unit 34, an identification computation unit 35, and an identification result output unit 36. Each of the image input unit 31 to the feature amount computation unit 34 of the recognition device 13 performs the same process of each of the image input unit 21 to the feature amount computation unit 24 of the learning device 11 with respect to the input image, the target object of which will be recognized, and thus the detailed description will be omitted.

The identification computation unit 35 reads the identification feature amount and the identifier recorded in the identifier recording unit 12. The identification computation unit 35 assigns that corresponding to the identification feature amount of the feature amounts from the feature amount computation unit 34 to the read identifier so as to perform an operation. The identification result output unit 36 acquires an operation result of the identification computation unit 35 and outputs an identification result indicating whether or not a target object is recognized in an input image based on the operation result.

Figure 2:
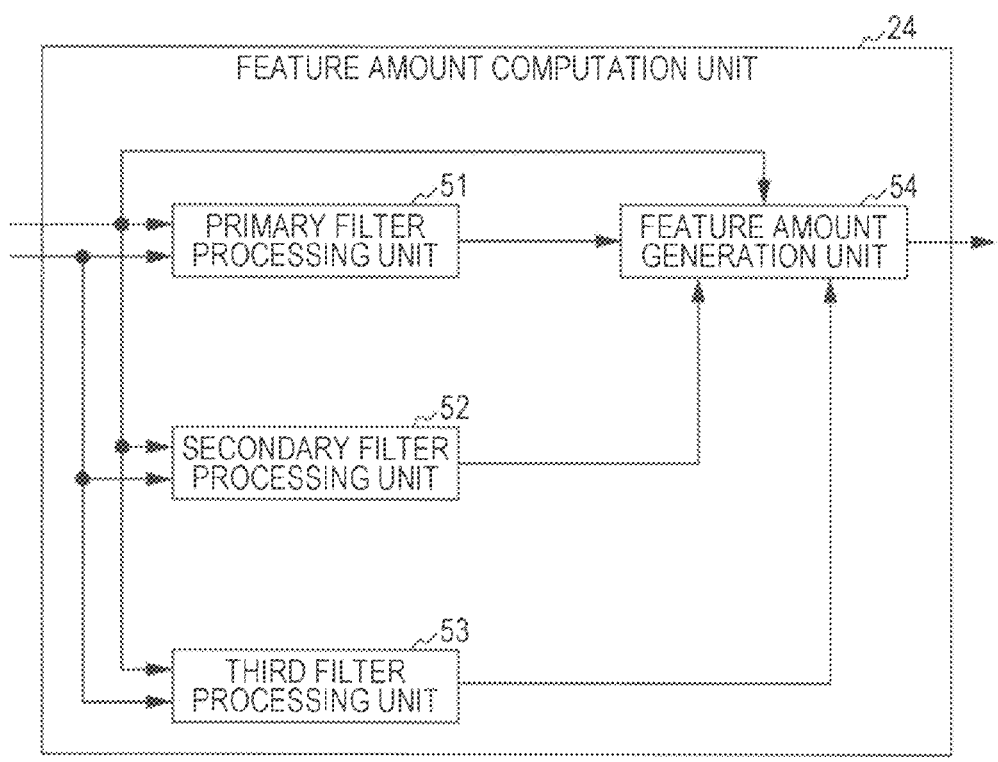
FIG. 2 is a diagram showing a detailed configuration example of a feature amount computation unit.

FIG. 2 is a diagram showing a detailed configuration example of the feature amount computation unit 24 of FIG. 1. The feature amount computation unit 34 has the same configuration as the feature amount computation unit 24. Thus, here, the configuration of the feature amount computation unit 24 will be described as an example. The feature amount computation unit 24 includes a primary filter processing unit 51, a secondary filter processing unit 52, a third filter processing unit 53, and a feature amount generation unit 54. The learning image from the feature point extraction unit 23 is supplied to the primary filter processing unit 51 to the feature amount generation unit 54 and the feature point is supplied to the primary filter processing unit 51 to the third filter processing unit 53.

The primary filter processing unit 51 performs a filter process by a linear differential function $G_1$ of a Gaussian function G with respect to the feature point for each supplied feature point so as to extract a feature amount and supplies the feature amount to the feature amount generation unit 54. Here, the Gaussian function G and the linear differential function $G_1$ are expressed by Equations 1 and 2.

$$G = e^{-\frac{x^2+y^2}{2\sigma^2}} \quad (1)$$

$$G_1(\theta) = \cos(\theta)G_1(0°) + \sin(\theta)G_1(90°) \quad (2)$$

In Equation 1, σ denotes a Gaussian width. In Equation 2, θ denotes a certain angle and denotes a direction of a filter to be computed.

For example, the primary filter processing unit 51 changes the Gaussian width σ of the Gaussian function G to three predetermined values (for example, Gaussian widths σ1, σ2, σ3=1, 2, 4) and computes Equation 2 with respect to 4 predetermined directions (for example, θ=θ1, θ2, θ3, θ4) for each Gaussian width σ.

In addition, the direction θ is not limited to 4 directions and may be 8 directions, for example, directions obtained by equally dividing pi into 8 directions. In the related art, as described above, although a process has been performed using a plurality of Gaussian widths, in the present embodiment, as described below, only one Gaussian width may be prepared. In other words, it is not necessary to change the Gaussian width. Accordingly, in the above description, although the case where "the Gaussian width is changed to three predetermined values and Equation 2 is computed with respect to the 4 predetermined directions for each Gaussian width σ" is described in the present embodiment, Equation 2 may be computed with respect to 4 directions of the predetermined directions in the set Gaussian width σ.

Accordingly, since it is not necessary to perform computation for each of the plurality of Gaussian widths, it is possible to reduce a computation amount. The same is true in the other filters, for example, the secondary filter processing unit 52 and the third filter processing unit 53.

The secondary filter processing unit 52 performs a filter process by a quadratic differential function $G_2$ of the Gaussian function G with respect to the feature point for each supplied feature point so as to extract a feature amount and supplies the feature amount to the feature amount generation unit 54. Equation 3 shows the quadratic differential function $G_2$ and, in Equation 3, θ denotes a certain angle.

$$G_2(\theta)=k_{21}(\theta)G_2(0°)+k_{22}(\theta)G_2(60°)+k_{23}(\theta)G_2(120°) \quad (3)$$

In Equation 3, a coefficient $k_{2i}(\theta)$ (where, i=1, 2, 3) denotes a function shown by Equation 4.

$$k_{2i}(\theta) = \frac{1}{3}\{1 + 2\cos(2(\theta - \theta_i))\} \quad (4)$$

For example, the secondary filter processing unit 52 computes Equation 3 with respect to 4 predetermined directions (for example, θ=θ1, θ2, θ3, θ4) for each Gaussian width σ of the Gaussian function G.

The third filter processing unit 53 performs a filter process by a cubic differential function $G_3$ of the Gaussian function G with respect to the feature point for each supplied feature point so as to extract a feature amount and supplies the feature amount to the feature amount generation unit 54. Equation 5 shows the cubic differential function $G_3$ and, in Equation 5, θ denotes a certain angle.

$$G_3(\theta)=k_{31}(\theta)G_3(0°)+k_{32}(\theta)G_3(45°)+k_{33}(\theta)G_3(90°)+k_{34}(\theta)G_3(135°) \quad (5)$$

In Equation 5, a coefficient $k_{3i}(\theta)$ (where, i=1, 2, 3) denotes a function shown by Equation 6.

$$k_{31}(\theta) = \frac{1}{4}\{2\cos(\theta - \theta_i) + 2\cos(3(\theta - \theta_i))\} \quad (6)$$

For example, the third filter processing unit 53 computes Equation 5 with respect to 4 predetermined directions (for example, θ=θ1, θ2, θ3, θ4) for predetermined Gaussian width σ of the Gaussian function G.

The feature amount generation unit 54 receives the supply of the feature amounts of the feature points computed with respect to the 4 directions θ supplied from each of the primary filter processing unit 51, the secondary filter processing unit 52 and the third filter processing unit 53 and realigns a supplied total of 12 (=3 (order)×4 (direction)) feature amounts as the feature amounts of the feature points.

Since the plurality of images with different resolutions is supplied from the multi-resolution image generation unit 22, the feature amounts of each feature point computed with respect to the 4 directions θ from each image are supplied to each filter processing unit. The supplied feature amounts depend on the number of images generated by the multi-resolution image generation unit 22 and, for example, if 8 images from a level 1 to a level 8 are generated, the feature amounts of each feature point computed with respect to the 4 directions θ of the 8 images are supplied.

The feature amount generation unit 54 supplies the generated feature amount and the supplied learning image to the identifier generation unit 25.

In this way, in the feature amount computation unit 24, a filter (base function) having selectivity in a direction θ which is obtained by differentiating the Gaussian function is used, different feature amounts (contour) are extracted for each differential order, and the feature amounts are obtained.

Figure 3:
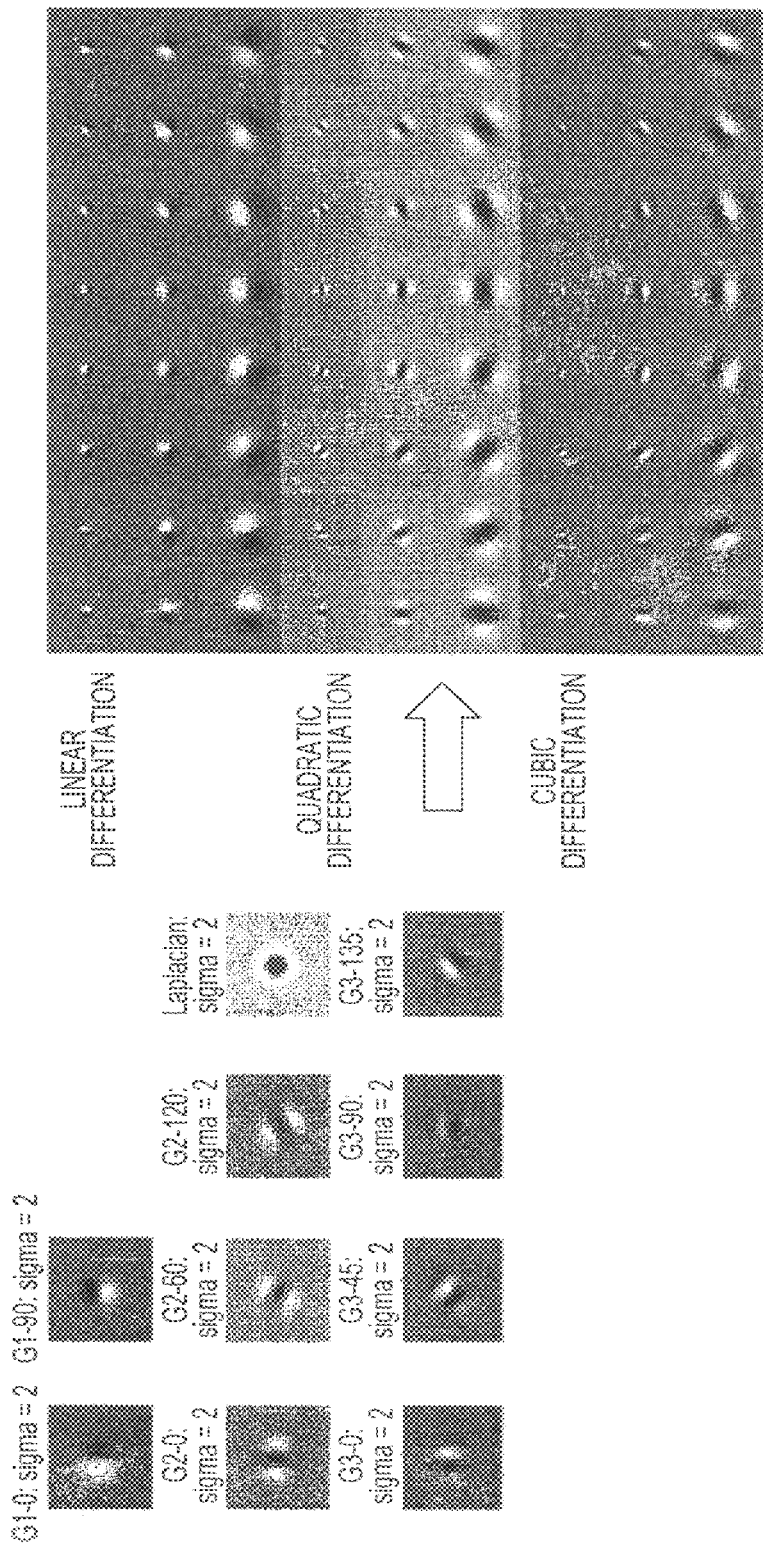
FIG. 3 is a diagram describing a steerable filter.

In the case where the steerable filter is used to extract the feature amount, as shown in FIG. 3, if filters having different directions θ and the Gaussian widths σ are prepared, by linear coupling of such filters, a filter of a certain direction θ, that is, a differential function $G_n$ (n=1, 2, 3) of the Gaussian function G, may be expressed.

In FIG. 3, in an image of an uppermost column of a left side of the figure, a linear differential function $G_1$ (0°) and a linear differential function $G_1$ (90°) of the case of the Gaussian width σ=2 are sequentially shown from the left side of the figure. In an image of a middle column of the left side of the figure, a quadratic differential function $G_2$ (0°), a quadratic differential function $G_2$ (60°), a quadratic differential function $G_2$ (120°), and a Laplacian of the case of the Gaussian width σ=2 are sequentially shown from the left side of the figure. In an image of a lowermost column of the left side of the figure, a cubic differential function $G_3$ (0°), a cubic differential function $G_3$ (45°), a cubic differential function $G_3$ (90°), and a cubic differential function $G_3$ (135°) of the case of the Gaussian width σ=2 are sequentially shown from the left side of the figure.

In an image of an uppermost column of horizontal columns of a right side of the figure, the direction θ of the linear differential function $G_1$ (θ) of the case of the Gaussian width σ=1 is 0, ⅛ pi, ⅖ pi, ⅜ pi, 4/8 pi, ⅝ pi, 6/8 pi, and ⅞ pi is sequentially shown from the left side of the figure.

Similarly, the linear differential function $G_1$ (θ) of the case of the Gaussian width σ=2, the linear differential function $G_1$ (θ) of the case of the Gaussian width σ=4, the quadratic differential function $G_2$ (θ) of the case of the Gaussian width σ=1, the quadratic differential function $G_2$ (θ) of the case of the Gaussian width σ=2, the quadratic differential function $G_2$ (θ) of the case of the Gaussian width σ=4, the cubic differential function $G_3$ (θ) of the case of the Gaussian width σ=1, the cubic differential function $G_3$ (θ) of the case of the Gaussian width σ=2, and the cubic differential function $G_3$ (θ) of the case of the Gaussian width σ=4 are sequentially shown downward from a second row from the top in the figure. In the images of each column, the direction θ of the differential function is sequentially 0, ⅛ pi, ⅖ pi, ⅜ pi, 4/8 pi, ⅝ pi, 6/8 pi, and ⅞ pi from the left side of the figure.

For example, since the linear differential function $G_1$ (0°) and the linear differential function $G_1$ (90°) which are the filters of the left side of the figure are used, the linear differential function $G_1$ (θ) of each direction θ of a second column of the top of the right side of the figure is shown. Similarly, in the figure, the quadratic differential function $G_2$ (θ) of each direction θ of a fifth column of the top of the right side of the figure is shown using the quadratic differential function $G_2$ of the left side and the cubic differential function $G_3$ (θ) of each direction θ of an eighth column of the top of the right side of the figure is shown using the cubic differential function $G_3$ of the left side. That is, the differential function of a certain direction of each dimension may be expressed by linear coupling of such base functions if base functions in numbers greater than the dimension by 1 are present.

Regarding Configuration of Identifier Generation Unit

Figure 4:
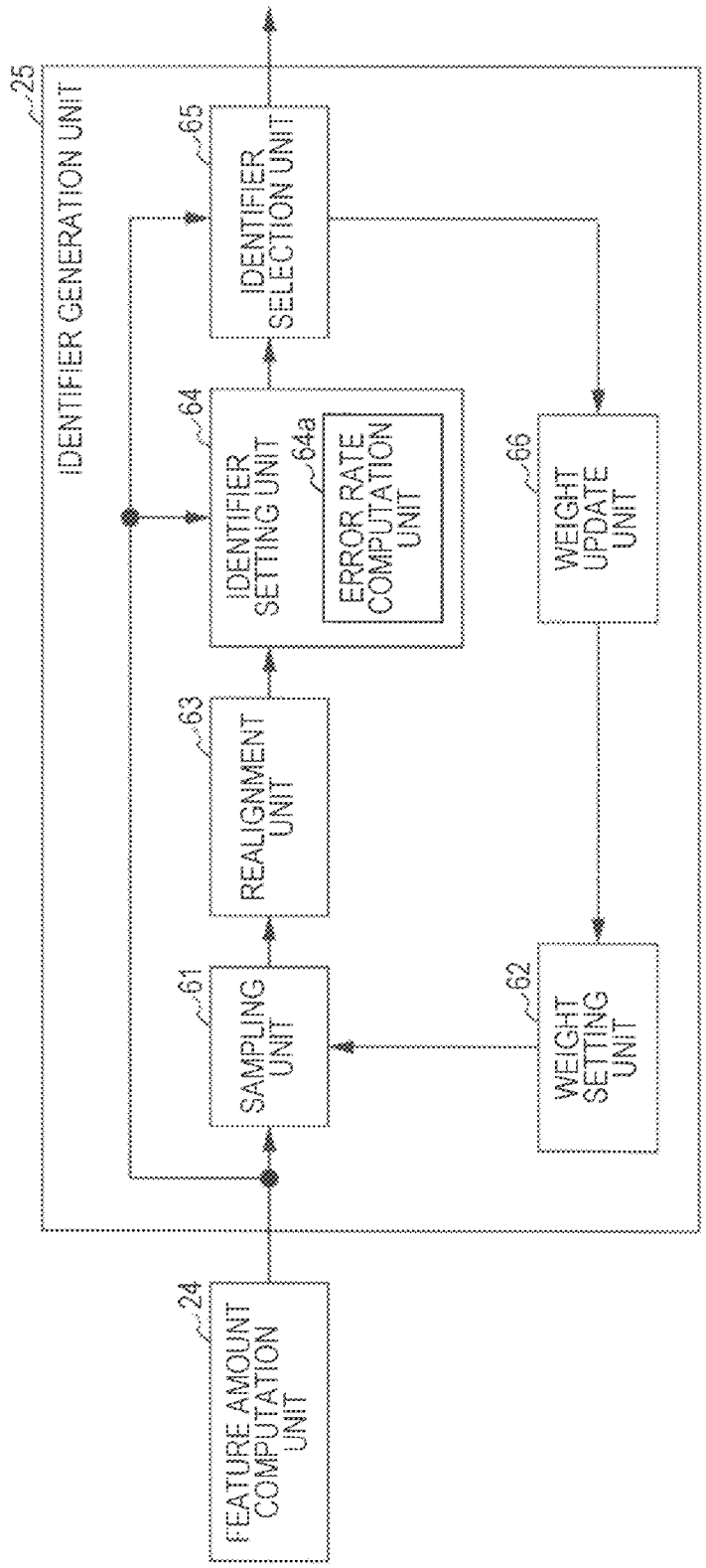
FIG. 4 is a diagram illustrating a detailed configuration example of an identifier generation unit.

FIG. 4 is a block diagram showing a detailed configuration example of the identifier generation unit 25 of FIG. 1. The identifier generation unit 25 includes a sampling unit 61, a weight setting unit 62, a realignment unit 63, an identifier setting unit 64, an identifier selection unit 65, and a weight update unit 66.

The sampling unit 61 samples M feature amounts of feature amounts of a pair of feature points at the same position as a plurality of learning images for each pair of feature points according to a weight of a learning image unit set by the weight setting unit 62 and supplies the sampled M feature amounts to the realignment unit 63.

The realignment unit 63 realigns the sampled M feature amounts in ascending or descending order with respect to the pair of feature points and supplies the realigned feature amounts to the identifier setting unit 64.

The identifier setting unit 64 controls an error rate computation unit 64a while changing a threshold, with respect to each pair of the feature amounts realigned in ascending or descending order, based on true/false information indicating whether or not a target object to be recognized is included in the learning image, from which the feature amount is extracted, computes an error rate, and sets a threshold (this threshold is set as a weak identifier) such that the error rate is minimized. In addition, the identifier setting unit 64 supplies the error rate of each weak identifier to the identifier selection unit 65.

The true/false information (label) indicating whether or not a target object is included in the learning image is attached to the learning image and the identifier setting unit 64 sets a weak identifier based on the true/false information attached to the learning image supplied from the feature amount computation unit 24.

The identifier selection unit 65 selects weak identifiers having minimum error rates from among weak identifiers, updates an identifier including the weak identifiers, and supplies a final identifier and feature amounts corresponding to the weak identifiers in the identifier recording unit 12. In addition, the identifier selection unit 65 computes reliability based on the error rate of the selected weak identifiers and supplies the reliability to the weight update unit 66.

The weight update unit 66 re-computes a weight of each learning image based on the supplied reliability, normalizes and updates the weight, and supplies an update result to the weight setting unit 62. The weight setting unit 62 sets a weight of a learning image unit based on the update result of the weight supplied from the weight update unit 66.

Regarding Learning Process

Next, a learning process performed by the learning device 11 will be described. When a learning image is input to the learning device 11 such that an identifier is instructed to be generated, the learning device 11 begins the learning process and generates the identifier by statistical learning. Hereinafter, the learning process using the learning device 11 will be described with reference to the flowcharts of FIGS. 5 to 7.

In step S11, the multi-resolution image generation unit 22 generates the multi-resolution images from the input learning image. As described above, the multi-resolution image generation unit 22 generates, for example, the multi-resolution images of 8 resolution layers from the level L1 to the level L8 and supplies the generated images to the feature point extraction unit 23. The feature point extraction unit 23 executes the process of step S11 and the subsequent steps with respect to one of the supplied multi-resolution images (the plurality of images with different resolutions) as a learning image to be processed and repeatedly executes the process of step S11 and the subsequent steps for each of the plurality of images.

Figure 8A:
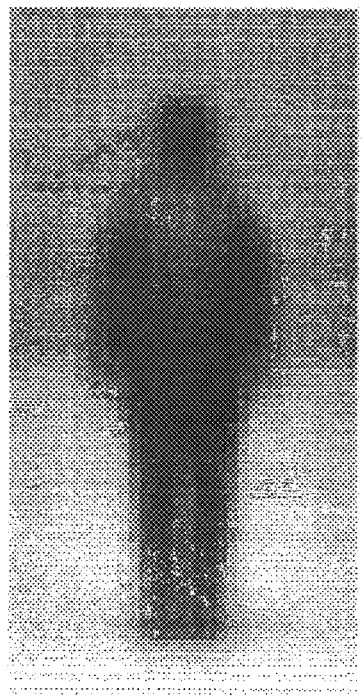
FIGS. 8A and 8B are diagrams describing generation of an identifier.
Figure 8B:
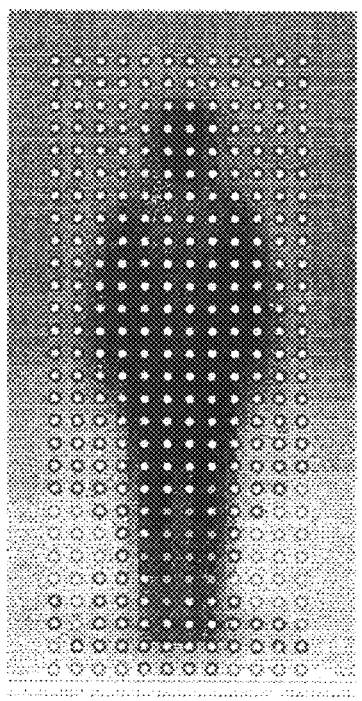

In step S12, the feature point extraction unit 23 extracts feature points from the input learning image. For example, if the learning image shown in FIG. 8A is input to the feature point extraction unit 23, the feature point extraction unit 23 extracts pixels realigned at a predetermined interval from the learning image as feature points as shown in FIG. 8B. In FIG. 8B, circles on the learning image denote pixels regarded as the feature points.

The learning images shown in FIGS. 8A and 8B include 32 pixels in a horizontal direction and 64 pixels in a vertical direction in the figure. The feature point extraction unit 23 selects pixels on the learning image as pixels of feature points every third pixel in the horizontal direction and the vertical direction. Thus, in the learning image, in the figure, 12 pixels of the horizontal direction and 28 pixels of the vertical direction, a total of 336 (=12×28) pixels, are selected as the feature points.

The feature point extraction unit 23 extracts the feature points from the learning image and supplies the extracted feature points and the input learning image to the feature amount computation unit 24.

In step S13, the feature amount computation unit 24 performs a feature amount computation process and computes the feature amounts of the feature points based on the feature points and the learning image supplied from the feature point extraction unit 23. The feature amount computation process corresponding to the process of step S13 will be described with reference to the flowchart of FIG. 6.

In step S51, the feature amount computation unit 24 and, more specifically, the primary filter processing unit 51, the secondary filter processing unit 52, and the third filter processing unit 53 of the feature amount computation unit 24 select one unprocessed feature point from among the feature points supplied from the feature point extraction unit 23 as a target pixel.

In step S52, the feature amount computation unit 24 sets a counter q indicating a direction $\theta_q$ to 1. Thus, the direction $\theta_q$ is $\theta_1$.

In step S53, the primary filter processing unit 51 performs a primary filter process. That is, the primary filter processing unit 51 calculates Equation 2 by setting the Gaussian width to $\sigma=1$ and setting the direction to $\theta_q$ based on the pixel value of the target pixel to be processed and supplies the filter processing result to the feature amount generation unit 54. That is, the direction $\theta$ of Equation 2 is $\theta_q$, the operation is performed, and the contour is extracted.

Although the "Gaussian width of $\sigma=1$" is described, in the present embodiment, since the Gaussian width is fixed to $\sigma=1$ (a filter of one Gaussian width is set in advance), the process of "setting the Gaussian width to $\sigma=1$" may be omitted. That is, in the present embodiment, the process of calculating Equation 2 by setting the direction of the filter having the Gaussian width $\sigma$ of 1 to $\theta_q$ is executed in step S53. Although the Gaussian width $\sigma$ is set to $\sigma=1$ in the description, the Gaussian width of the previously prepared filter may not be $\sigma=1$.

In step S54, the secondary filter processing unit 52 performs a secondary filter process. That is, the secondary filter processing unit 52 calculates Equation 3 by setting the direction of the filter having the Gaussian width of $\sigma=1$ to $\theta_q$ based on the pixel value of the target pixel and supplies the filter processing result to the feature amount generation unit 54. That is, the direction $\theta$ of Equation 3 is $\theta_q$, the operation is performed, and the contour is extracted.

In step S55, the third filter processing unit 53 performs a third filter process. That is, the third filter processing unit 53 calculates Equation 5 by setting the direction of the filter having the Gaussian width of $\sigma=1$ to $\theta_q$ based on the pixel value of the target pixel and supplies the filter processing result to the feature amount generation unit 54. That is, the direction $\theta$ of Equation 5 is $\theta_q$, the operation is performed, and the contour is extracted.

In step S56, the feature amount computation unit 24 determines whether or not the direction $\theta_q$ is $\theta_4$, that is, counter q=4. If it is determined that the direction $\theta_q$ is not $\theta_4$ in step S56, the feature amount computation unit 24 increases the counter q in step S57. For example, in the case of the counter of q=1, the counter q is increased to q=2 and thus the direction $\theta_q$ is $\theta_2$. If the counter q is increased, the process returns to step S53 and the above-described process is repeated.

In contrast, if it is determined that the direction $\theta_q$ is $\theta_4$ in step S56, the feature amount generation unit 54 synthesizes the operation results supplied from the primary filter processing unit 51, the secondary filter processing unit 52, and the third filter processing unit 53 as the feature amount and generates the feature amount of one feature point in step S58.

The feature amount is obtained by the following Equation 7 or 8.

$$v_j = \sum_{x,y} |G_{d,\theta} \otimes I(x_i, y_i, s_i)| \quad (7)$$

$$v_j = \max_{x,y} |G_{d,\theta} \otimes I(x_i, y_i, s_i)| \quad (8)$$

In Equations 7 and 8, $G_{d,\theta}$ is a d-th differential function of the Gaussian function G of a certain angle $\theta$, similar to Equation 2. In $I(x_i, y_i, s_i)$, $(x_i, y_i)$ denotes a coordinate within the image of the feature point to be processed and $(s_i)$ denotes the scale of the image to be processed among the images configuring the multi-resolution images.

Equation 7 is an equation for performing convolution with respect to the d-th differential function of the Gaussian function G of the certain angle $\theta$ and the feature amount and summing the absolute values using $\Sigma$. Equation 8 is an equation for performing convolution with respect to the d-th differential function of the Gaussian function G of the certain angle $\theta$ and the feature amount and taking a maximum value of the absolute values thereof as max.

Equations 7 and 8 are both used to calculate the feature amount, but Equation 7 is used to compute local energy and Equation 8 is used to compute a local maximum value. Now, the meaning of these equations will be described.

By the above-described process, supervised statistical learning is performed using a filter coefficient extracted from a scale and a function of a certain angle as the feature amount, so as to generate a detection identifier for detecting an object such as a person. However, in the detection identifier, for example, a feature amount which depends on a relationship between clothes that a person wears and a background is obtained. In regard to an authentication object having large distortion or variation, such as a person, the feature amount has too much selectivity. Accordingly, it is necessary to perform a process while absorbing this and it is necessary to set each feature amount to an invariable feature amount.

In order to set the "feature amount which depends on the relationship between clothes that the person wears and the background" to the invariable feature amount, the absolute value of the output value after the filter process is operated. By operating the absolute value, it is possible to extract a feature amount close to the contour of the person. Further, in the present embodiment, the linear differential function, the quadratic differential function, and the cubic differential function are operated and the absolute values are operated. Accordingly, as compared to the case where operation is performed using only the absolute value by the linear differential function, it is possible to improve accuracy and to calculate an invariable feature amount.

In the case of "the feature amount has too much selectivity in regard to an authentication object having large distortion or variation, such as a person", it is possible to calculate the feature amount while absorbing this by performing an invariable operation by a position gap. The invariable operation by the position gap is an operation in which, when the contour of the face of a person is detected, the length of the contour is substantially identical regardless of the shape of the face. In other words, when focusing upon a predetermined portion of the contour, even when the portion is positionally shifted, for example, when the contour of a person having a substantially round face is positionally moved so as to overlap the contour of a person having an elongated face, the value such as the length is invariable except for a position shift.

As such an operation, the summation is operated as shown in Equation 7. By operating the sum, for example, the sum of the contour of the face of the person is operated. Alternatively, as shown in Equation 8, the maximum value is operated. By operating the maximum value, for example, a maximum value of the contour of the face of the person is operated.

Here, the sum and the maximum value are operated. In other words, as described above, an operation for computing local energy based on Equation 7 or an operation for computing a local maximum value based on Equation 8 is shown. In addition, an operation for computing local energy of the periphery of a point having a local maximum value may be performed. This is an image which receives the operation result of Equation 8 and performs the operation of Equation 7. Alternatively, an operation for computing the maximum value of the periphery of local energy may be performed. This is an image which receives the operation result of Equation 7 and performs the operation of Equation 8. Although the equation is not shown in detail, the feature amount may be calculated by such an operation.

Figure 6:
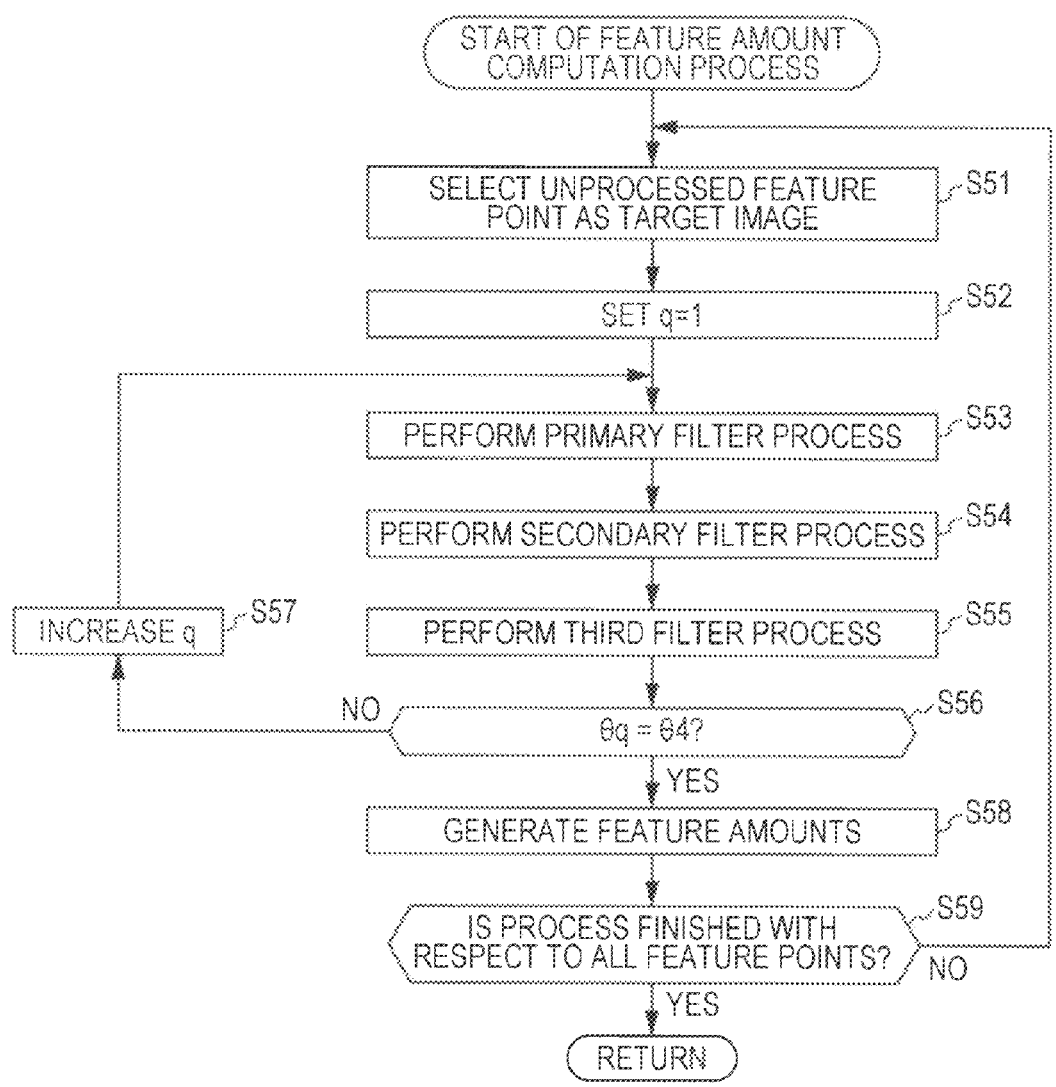
FIG. 6 is a flowchart describing a feature amount computation process.
Figure 7:
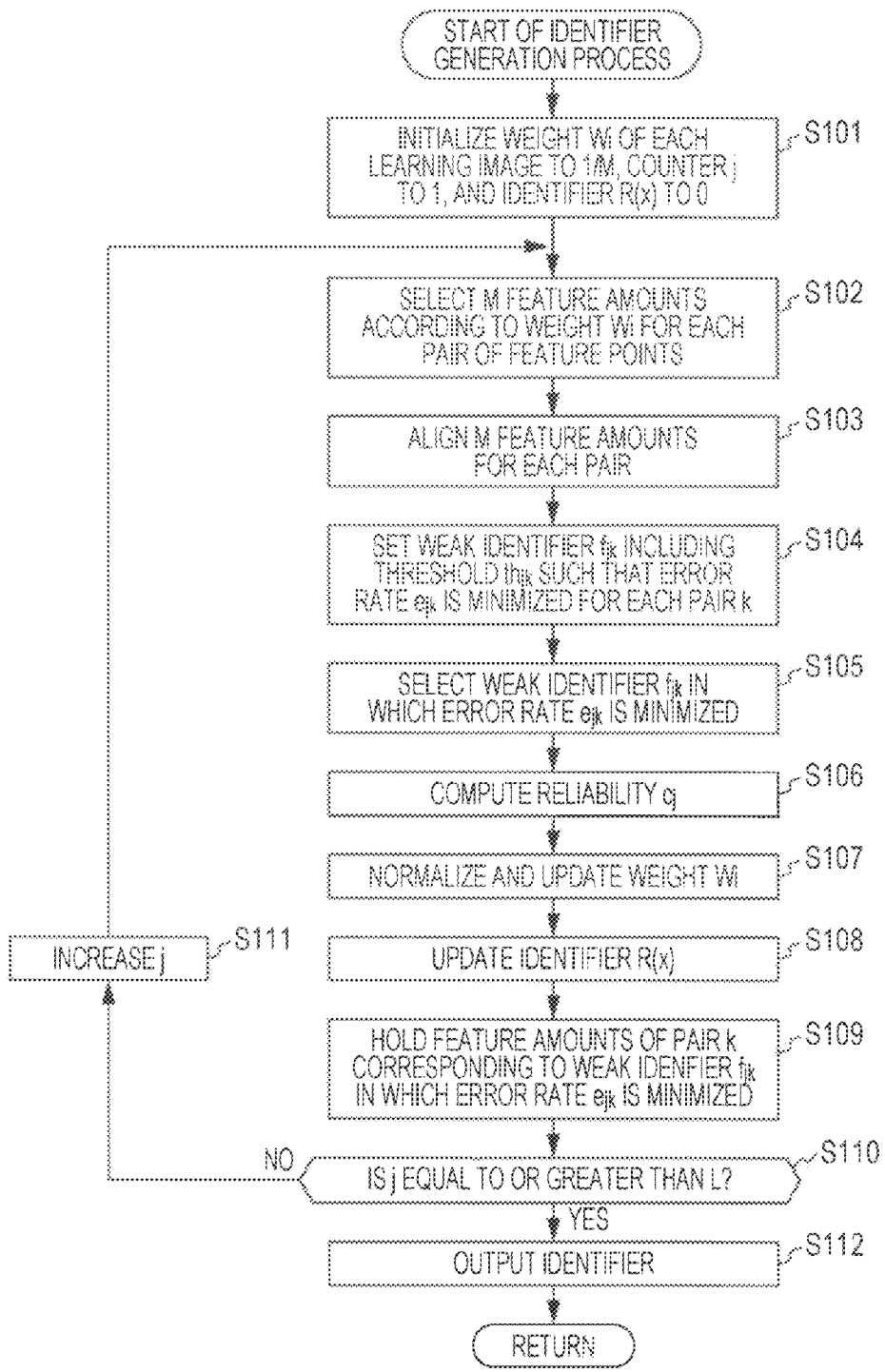
FIG. 7 is a flowchart describing an identifier generation process.

The description returns to the flowchart shown in FIG. 6. In step S58, the feature amount is calculated from each feature amount by such an operation. In step S59, the feature amount computation unit 24 determines whether or not the process is finished with respect to all feature points. For example, in the case where the feature amounts are obtained with respect to all the feature points supplied from the feature point extraction unit 23, it is determined that the process is finished.

If it is determined that the process is not finished with respect to all feature points in step S59, the process returns to step S51 of selecting a next feature point as the target pixel. In contrast, if it is determined that the process is finished with respect to all feature points in step S59, the feature amount generation unit 54 supplies the learning image supplied from the feature point extraction unit 23 and the generated feature amounts of the feature points to the identifier generation unit 25. Thereafter, the process proceeds to step S14 of FIG. 5.

Extraction of the feature amounts from the learning image is not limited to a steerable filter and a Gabor filter or the like may be used.

Figure 5:
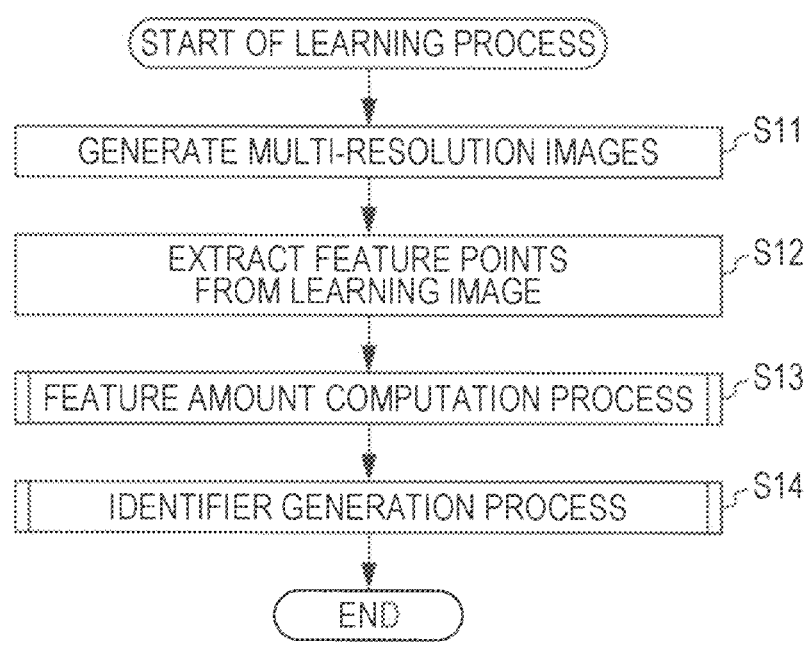
FIG. 5 is a flowchart describing a learning process.

The description returns to the flowchart of FIG. 5. If the feature amounts of the feature points are obtained, in step S14, the identifier generation unit 25 performs an identifier generation process based on the learning image and the feature amounts supplied from the feature amount computation unit 24 and generates an identifier. The identifier generation process executed in step S14 will be described with reference to the flowchart of FIG. 7.

Figure 9:
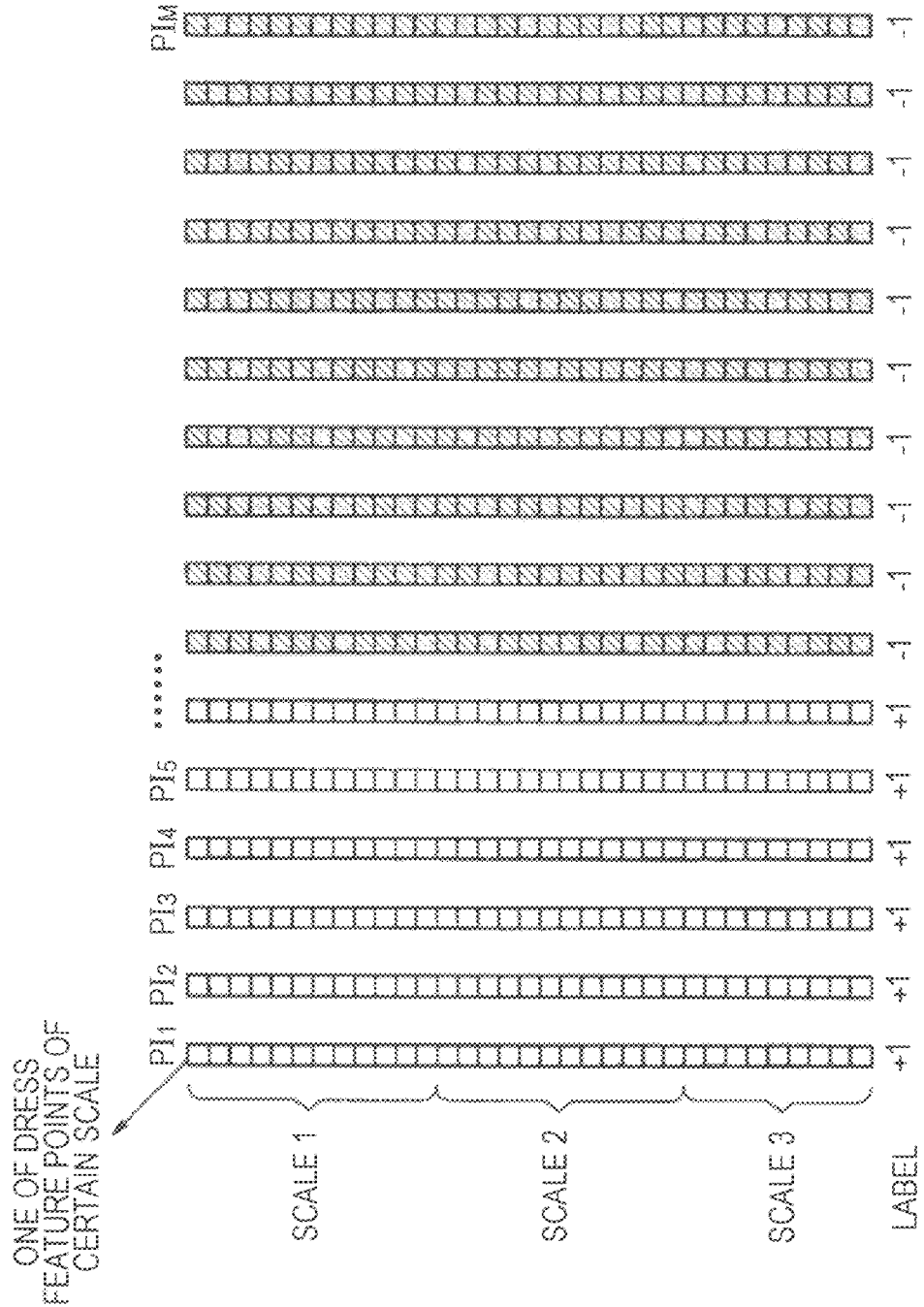
FIG. 9 is a diagram describing a feature amount.

In step S101, the weight setting unit 62 initializes, for example, all the weights Wi of the learning images $PI_i$ ($1 \leq i \leq M$) shown in FIGS. 9 to 1/M and the identifier selection unit 65 initializes the counter j to 1 and initializes the identifier R(x) including a sum of weak identifiers to 0.

Here, i is to identify the learning image $PI_i$ of FIG. 9 and is $1 \leq i \leq M$. By the process of step S101, the weights $W_i$ of all the learning images $PI_i$ are set to the same normalized weight (=1/M). The counter j denotes the number of times of updating the identifier R(x), which is set in advance.

In step S102, the sampling unit 61 selects M feature amounts from among the feature amounts of the pair of feature points of the same position of each of the plurality of learning images $PI_i$ according to the weights $W_i$ of the learning images $PI_i$ for each pair of the feature points and supplies the selected M feature amounts to the realignment unit 63.

For example, the M feature amounts of the learning image $PI_1$ to learning image $PI_M$ are supplied from the feature amount computation unit 24 to the sampling unit 61, as shown in FIG. 10. In FIG. 10, the feature amounts obtained from the learning images $PI_i$ ($1 \leq i \leq M$) are realigned in the horizontal direction of the figure and a numeral "+1" or "−1" of a left side of the figure of the character $PI_i$ indicating the learning image denotes a label (true/false information) added to the learning image $PI_i$.

That is, $(A_1, A_2, A_3, \ldots,$ and $A_N)$ realigned in the horizontal direction of an uppermost side of the figure denote the feature amounts of each pair of the feature points of the learning image $PI_1$ and the character "+1" of the left side of the figure of the character "$PI_1$" indicating the learning image $PI_1$ denotes the label indicating that a target object is included in the learning image $PI_1$.

Similarly, $(B_1, B_2, B_3, \ldots,$ and $B_N)$ realigned in the horizontal direction of a second column of the top of the figure denote the feature amounts of each pair of the feature points of the learning image $PI_2$ and the character "+1" of the left side of the figure of the character "$PI_2$" indicating the learning image $PI_2$ denotes the label indicating that a target object is included in the learning image $PI_2$.

In addition, $(C_1, C_2, C_3, \ldots,$ and $C_N)$ realigned in the horizontal direction of a third column of the top of the figure denote the feature amounts of each pair of the feature points of the learning image $PI_3$ and the character "−1" of the left side of the figure of the character "$PI_3$" denotes the label indicating that a target object is not included in the learning image $PI_3$. In addition, $(M_1, M_2, M_3, \ldots,$ and $M_N)$ realigned in the horizontal direction of an M-th column of the top of the figure denote the feature amounts of each pair of the feature points of the learning image $PI_M$ and the character "−1" of the left side of the figure of the character "$PI_M$" denotes the label indicating that a target object is not included in the learning image $PI_M$.

In the example of FIG. 10, the feature amounts of the N pairs of feature points may be obtained from one learning image $PI_i$. In FIG. 10, M feature amounts of the feature amount $A_k$ to feature amount $M_k$ ($1 \leq k \leq M$) realigned in the vertical direction are regarded as one group $Gr_k$ and the feature amounts belonging to the group $Gr_k$ are the feature amounts of the pair of feature points of the same position of each learning image $PI_i$.

For example, the group $Gr_1$ includes the feature amount $A_1$ to the feature amount $M_1$ realigned in the vertical direction, and two feature points forming the pair of the learning images $PI_i$ in which the feature amount $A_1$ is obtained and other feature amounts belonging to the group Gr, for example, two feature points forming the pair of the learning images $PI_M$ in which the feature amount $M_1$ is obtained, are positioned at the same position of the learning image. In addition, hereinafter, as the pair of feature points of each learning image $PI_i$, a pair in which the feature amounts belonging to the group $Gr_k$ ($1 \le k \le N$) are obtained is referred to as a pair k.

When the feature amounts of each learning image $PI_i$ shown in FIG. 10 are supplied to the sampling unit 61, the sampling unit 61 selects M feature amounts from among the feature amounts belonging to the group by lot according to the weights $W_i$ of the learning images $PI_i$ for each pair k, that is, the group $Gr_k$. For example, the sampling unit 61 selects M feature amounts from the feature amounts $A_1$ to the feature amount $M_1$ belonging to the group $Gr_1$ according to the weights $W_i$. In addition, in the first process, since all the weights $W_i$ are 1/M and are the same, M feature amounts are drawn, all feature amounts are stochastically selected. To this end, here, in the first process, all feature amounts are selected in each group $Gr_k$. Of course, in reality, the same feature amount may be repeatedly selected.

The weight $W_i$ may be used to compute error for each pair of feature points. In this case, a data weight coefficient (weight $W_i$) is multiplied by an error value so as to compute errors.

In step S103, the realignment unit 63 realigns the selected M feature amounts in ascending or descending order for each group $Gr_k$, that is, each pair k, with respect to each of N groups $Gr_k$ and supplies the realigned M feature amounts to the identifier setting unit 64. For example, the M feature amounts selected from among the feature amounts belonging to the group $Gr_1$ of FIG. 10 may be sequentially realigned.

In step S104, the identifier setting unit 64 controls the error rate computation unit 64a while changing the threshold, for each group $Gr_k$, that is, each pair k of feature points, based on the true/false information (label) attached to the learning image supplied from the feature amount computation unit 24, computes the error rate $e_{jk}$ as shown in the following Equation 11, and sets the threshold such that the error rate $e_{jk}$ is minimized.

Here, the threshold $th_{jk}$ for each pair k of feature points becomes one weak identifier $f_{jk}$. The identifier setting unit 64 supplies the error rate $e_{jk}$ for each weak identifier $f_{jk}$ to the identifier selection unit 65. That is, each of N weak identifiers $f_{jk}$ is set with respect to each of N pairs k, and the error rate $e_{jk}$ is obtained with respect to each of N weak identifiers $f_{jk}$. In addition, the weak identifier $f_{jk}$ is a function for outputting "+1" if a target object to be recognized is included and outputting "−1" if a target object to be recognized is not included.

For example, as shown in FIG. 11, if j=1 and the feature amounts of the pair k=1 of feature points are realigned in ascending or descending order in $L_1, A_1, C_1, B_1, \ldots,$ and $M_1$, the threshold $th_{11}$ is set between the feature amounts $A_1$ and $C_1$. When it is recognized that a target object to be recognized is not present in a range less than the threshold $th_{11}$ (a range denoted by "−1") and it is recognized that a target object to be recognized is present in a range greater than the threshold $th_{11}$ (a range denoted by "+1"), since the feature amount $A_1$ surrounded by a dotted line of the figure is a feature amount of the learning image in which the target object to be recognized is included, an error occurs. Since the feature amounts $C_1$ and $M_1$ are feature amounts of the learning image in which the target object to be recognized is not included, an error occurs.

In the example of FIG. 11, the threshold $th_{11}$ is set to a position where the error rate $e_{jk}$ is minimized. For example, if the threshold $th_{11}$ shown in FIG. 11 is not the position where the error rate $e_{jk}$ is minimized, the identifier setting unit 64 changes the position of the threshold $th_{11}$, finds the position of the threshold $th_{11}$ where the error rate $e_{jk}$ is minimized while referring to the error rate $e_{jk}$ of each position, and sets the position to the position of the threshold $th_{11}$.

The error rate computation unit 64a adds the weight $W_i$ of the learning image, from which the feature amount having an error is extracted, based on the true/false information (label) of the learning image and computes the error rate $e_{jk}$, as shown in the following Equation 9.

$$e_{jk} = E_w[1_{(y \ne f_{jk})}] \quad (9)$$

where $y \ne f_{jk}$ denotes the condition of the pair k of feature amounts having an error and $E_w$ denotes adding of the weight to the pair k having an error.

In step S105, the identifier selection unit 65 selects a weak identifier $f_{jk}$ in which the error rate $e_{jk}$ is minimized from among N weak identifiers $f_{jk}$, based on N error rates $e_{jk}$ of each pair k supplied from the identifier setting unit 64. The identifier selection unit 65 acquires the selected weak identifier $f_{jk}$ from the identifier setting unit 64.

In step S106, the identifier selection unit 65 computes reliability $c_j$ shown in the following Equation 10 based on the error rate $e_{jk}$ of the selected weak identifier $f_{jk}$ and supplies the computation result to the weight update unit 66.

$$c_j = \log((1-e_j)/e_j) \quad (10)$$

In addition, in Equation 10, $e_j$ denotes a minimum error rate $e_{jk}$ among the error rates $e_{jk}$ of the selected weak identifiers $f_{jk}$, that is, N error rates $e_{jk}$, among the error rates $e_{jk}$. Hereinafter, the weak identifier of the pair k selected in the process of step S105 is referred to as a weak identifier $f_j$ and the error rate $e_{jk}$ of the weak identifier $f_j$ is referred to as an error rate $e_j$.

In step S107, the weight update unit 66 computes the following Equation 11 based on the supplied reliability $c_j$, re-computes the weights $W_i$ of the learning images $PI_i$, normalizes and updates all weights $W_i$, and supplies the update result to the weight setting unit 62. The weight setting unit 62 sets the weights of the learning images based on the update result of the weights supplied from the weight update unit 66.

$$w_i = w_i \exp[-c_j \cdot 1_{(y \ne f_j)}], i = 1, 2 \ldots N \quad (11)$$

In Equation 11, the weights $W_i$ of the learning images including the feature amounts having an error are increased.

In step S108, the identifier selection unit 65 updates the stored identifier R(x) using a newly obtained weak identifier $f_j$. That is, the identifier selection unit 65 computes the following Equation 12 and updates the identifier R(x).

$$R(x) = R'(x) + c_j \times f_j(x) \quad (12)$$

In Equation 12, R'(x) denotes an identifier before update, which is stored in the identifier selection unit 65 and $f_j(x)$ denotes a newly obtained weak identifier $f_j$. That is, the identifier selection unit 65 multiplies the stored identifier by the reliability $c_j$ so as to obtain a weight and adds the newly obtained weak identifier to the weight, thereby updating the identifier.

In step S109, the identifier selection unit 65 stores the feature amounts of the pair k of feature points corresponding to the weak identifier $f_{jk}$ in which the error rate $e_{jk}$ is minimized as identification feature amounts.

In step S110, the identifier selection unit 65 determines whether or not the counter j is equal to or greater than L. If it is determined that the counter j is not equal to or greater than L in step S110, the identifier selection unit 65 increases the counter j in step S111. Thereafter, the process returns to step S102 and the above-described process is repeated.

That is, the weights $W_i$ of the newly set learning images are used, the new weak identifiers $f_{jk}$ are set with respect to N pairs k, and the weak identifiers $f_{jk}$ in which the error rate $e_{jk}$ is minimized are selected from the weak identifier $f_{jk}$. The identifier is updated by the selected weak identifiers $f_{jk}$.

In contrast, if it is determined that the counter j is equal to or greater than L in step S110, the identifier selection unit 65 outputs the stored identifier and the identification feature amounts to the identifier recording unit 12 in step S112.

By the above process, the identifier including the L weak identifiers $f_j$ ($1 \leq j \leq L$) in which the error rates are relatively low is supplied to the identifier recording unit 12 and the feature amounts of the pair k of feature points to be used as the weak identifier $f_j$ are supplied to the identifier recording unit 12. Here, L is $L \leq M$.

In addition, using the identifier of Equation 12, if an identifier (function) for outputting "+1" when the identifier to which the feature amounts are assigned is positive and outputting "−1" when the identifier is negative is generated, the identifier is a function for outputting presence or absence of a target object to be recognized by majority voting of L weak identifiers. In addition, the learning process of repeatedly weighting and adding the weak identifiers described with reference to the flowchart of FIG. 6 by the learning process and generating the identifier is called Discrete Adaboost Algorithm.

That is, by the above identifier generation process, the process of computing the weak identifiers and the error rates for each pair of feature points is repeated such that the weights of the feature amounts of the learning images having high error rates are sequentially increased and the weights of the feature amounts having low error rates are decreased. Accordingly, in the repeated processes (the process of steps S102 to S111), since the feature amounts having high error rates become gradually more easily selected in the feature amounts selected when setting the weak identifiers (the feature amounts selected in step S102), the selected learning is repeated as the feature amounts which are hard to be recognized are repeated. Thus, more feature amounts of the learning image which is hard to be recognized are selected and a high recognition rate is finally obtained.

In the repeated process (the process of steps S102 to S111), since the identifier selection unit 65 selects the weak identifiers corresponding to the pair having lowest error rates, by the repetition of the learning process, the weak identifiers of the pair of feature points having the highest reliability are selected and added to the identifier and the weak identifiers with high accuracy are sequentially added upon repetition.

In addition, the identifier identifies whether or not a person is included in an image as a target object using feature amounts. The pair of feature points corresponding to the feature amounts assigned to each weak identifier configuring the identifier is suitable for detecting the target object from the input image among the pairs of feature amounts.

As described above, the input image is set to images with different resolutions and a filter process is performed with respect to the images with the different resolutions. Thus, it is possible to improve computation efficiency and improve a processing speed. Accordingly, for example, it is possible to recognize an object such as a person in real time.

For example, if a process using a plurality of filters is performed with respect to images with a plurality of scales, many filter operations are necessary and a processing time and processing capability may be increased. However, as in the present embodiment, since a process using one filter is performed with respect to images with a plurality of scales, in other words, since one scale is solved by convolution, the process may be performed without many operations. Therefore, it is possible to improve a processing speed.

In the case of a multi-scale filter, if a frequency is low (the Gaussian width σ is increased), it takes much time to perform convolution. However, according to the present embodiment, as described above, it is possible to configure the filter using one Gaussian width, it is not necessary to prepare a filter with a plurality of Gaussian widths, and it is not necessary to perform operation using the filter with the plurality of Gaussian widths. Accordingly, according to the present embodiment, even when only the one highest frequency filter is prepared, it is possible to improve a processing speed as compared to the case of a multi-scale filter.

Regarding Optimization of Termination Operation of Boosting

Figure 12:
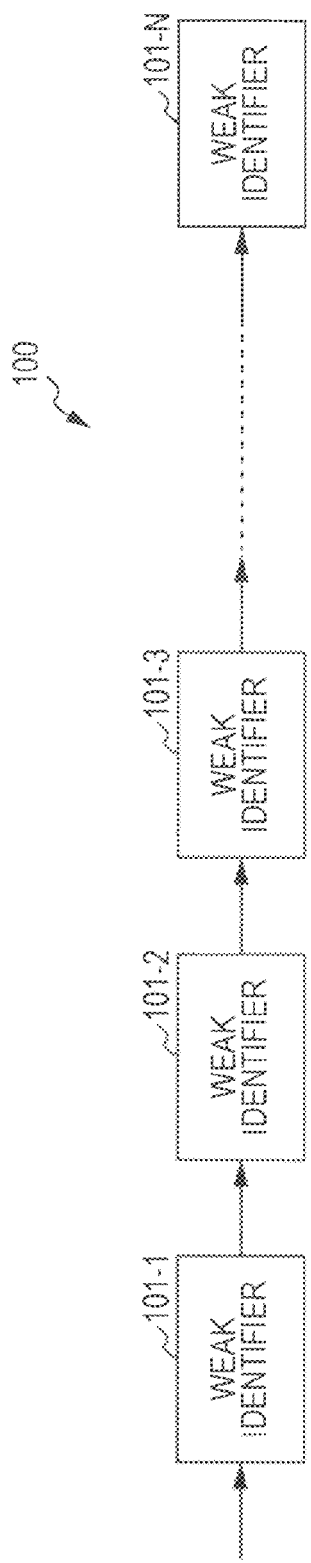
FIG. 12 is a diagram describing the configuration of an identifier.

In this way, if the identifier is generated, optimization is performed. The generated identifier includes a plurality of weak identifiers as shown in FIG. 12. The identifier 100 shown in FIG. 12 includes N weak identifiers 101-1 to 101-N. The identifier 100 sequentially performs the process of the weak identifiers 101 so as to start the process of the weak identifier 101-2 if the process of the weak identifier 101-1 is finished and start the process of the weak identifier 101-3 if the process of the weak identifier 101-2 is finished, thereby outputting a final identification result.

More specifically, the operation based on the following Equation 13 is performed by the identifier 100.

$$F(x)=f1(x)+f2(x)+f3(x)+\ldots+fn(x) \qquad (13)$$

In Equation 13, F(x) denotes the operation result output from the identifier 100. f1(x) denotes the operation result of the weak identifier 101-1, f2(x) denotes the operation result of the weak identifier 101-2, f3(x) denotes the operation result of the weak identifier 101-3, and fn(x) denotes the operation result of the weak identifier 101-N.

The identifier 100 sequentially performs the operation for adding the outputs from the weak identifiers 101. By stopping the operation of Equation 13 at a time when the value (accumulated value) obtained by sequentially adding the values from the weak identifiers 101 becomes equal to or less than a threshold, it is possible to shorten an operation time of the identifier 100.

For example, when the operation result of the weak identifier 101-1 satisfies f1(x)<th1, the operation of the identifier 100 is stopped by the operation of the weak identifier 101-1 and the operation after the weak identifier 101-2 is not performed.

For example, when the operation result of the weak identifier 101-2 satisfies f1(x)+f2(x)<th2, the operation of the identifier 100 is stopped by the operation of the weak identifier 101-2 and the operation after the weak identifier 101-3 is not performed.

In this way, at a time when the sum operation of the weak identifiers 101 becomes equal to or less than a predetermined threshold, the operation is stopped by the weak identifier 101 and the operation after the weak identifier 101 is not performed. Accordingly, it is possible to perform a high-speed operation with respect to the identifier 100. By setting the threshold applied to each weak identifier 101 to a suitable value, it is possible to suitably set an operation termination timing.

Figure 13:
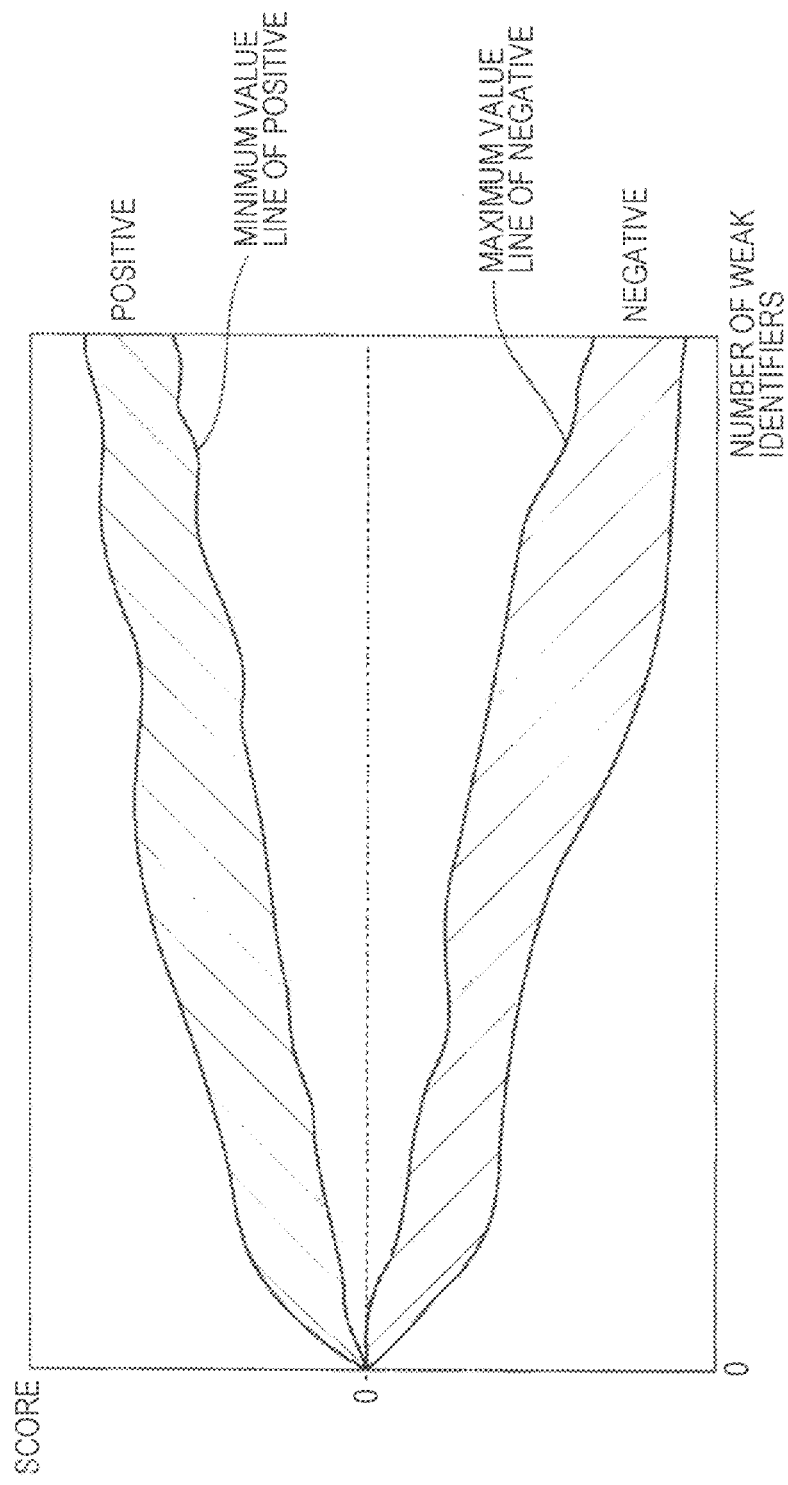
FIG. 13 is a diagram showing a relationship between an accumulation value and a weak discriminator.

FIG. 13 shows a graph showing a relationship between a score (accumulated value) when the operation is performed based on Equation 13 and the number of weak identifiers. The graph shown in FIG. 13 is a graph when a predetermined number of weak identifiers, for example, 100 weak identifiers 101-1 to 101-100 and a graph which traces a score when a positive image and a negative image are identified in each weak identifier 101. In other words, at a time when the operation shown in Equation 13 of each weak identifier 101 is finished, the tracing of the value of F(x) at that time in association with the weak identifier 101 is shown in the graph of FIG. 13.

A line (hereinafter, appropriately referred to as a positive line) when tracing the score when the positive image is processed and a line (hereinafter, appropriately referred to as a negative line) when tracing the accumulated value when the negative image is processed are set. In the graph shown in FIG. 13, when the positive image in which the target object is imaged is an object to be processed, the score tends to be sequentially increased whenever the process of the weak identifier 101 is finished. In contrast, when the negative image in which the target object is not imaged is an object to be processed, the score tends to be sequentially decreased whenever the process of the weak identifier 101 is finished.

A line (hereinafter, appropriately referred to as a negative maximum value line) tracing the score of a maximum value when the negative image is processed is denoted by a thick line in FIG. 13. A line (hereinafter, appropriately referred to as a positive minimum value line) tracing the score of a minimum value when the positive image is processed is denoted by a thick line in FIG. 13.

When such a graph is created, at a time when the negative line comes to the lower side of the positive minimum value line, the operation for a sample image of the object to be processed is terminated. In addition, since computation is terminated during actual recognition, the score is not added (the accumulated value is not calculated after termination), but, in FIG. 13, in order to understand a property, the accumulated value is obtained and displayed with respect to all samples.

If the score is accumulated, even in a negative sample image which falls below the positive minimum value line once, the score may be increased so as to exceed the positive minimum value line. However, the operation is terminated and the identification result of the positive image is not output.

A situation at a time when the negative line comes to the lower side of the positive minimum value line will be described. For example, the identifier 100 is an identifier for identifying a "hand". In this case, the positive image is an image in which the "hand" is imaged and the negative image is an image in which the "hand" is not imaged. The positive minimum value line is a minimum value which may be taken by the accumulated value of the weak identifier 101 when the positive image is processed. Accordingly, a score (score less than a minimum value) located below the positive minimum value line is obtained when the negative image is processed.

Accordingly, when the score located below the positive minimum value line is obtained, it may be determined that a sample image which is an object to be processed is a negative image. If it is used, when the score located below the positive minimum value line is obtained, it may be determined that the image is the negative image. Thus, at that time, the operation is terminated and an identification result of the negative image may be output.

In this way, by terminating the operation at a time when the score located below the positive minimum value line is obtained, it is possible to shorten the operation time of the identifier 100. If the operation may be terminated at an early stage, it is possible to increase the speed. As described above, the identifier 100 includes the plurality of weak identifiers 101 and the order of operations of the weak identifiers 101 is defined. Accordingly, if the operation is terminated by the weak identifier 101 arranged at the beginning portion of the operation order, it is possible to increase the operation speed of the identifier 100.

If this is considered, it is possible to generate the identifier 100 for performing termination at an early stage by optimally setting the operation order of the weak identifiers 101. For example, if the weak identifier 101 having a feature in which termination is easily performed is located at the beginning portion, the termination of the operation may be performed at the beginning portion and thus the operation of the weak identifier 101 which is located at the last half may not be performed. In this way, the optimal arrangement of the weak identifiers 101 is associated with operation efficiency of the identifier 100.

Regarding First Realignment Process

Figure 14:
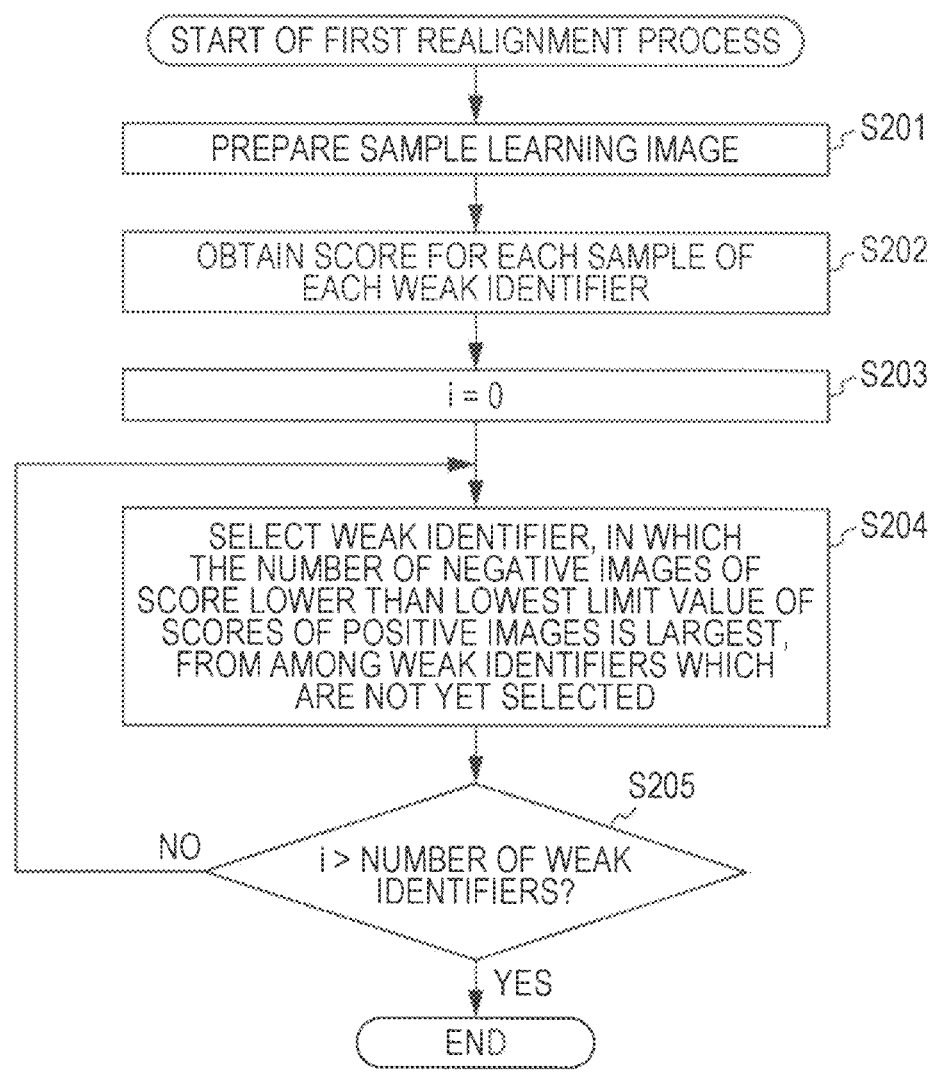
FIG. 14 is a flowchart describing a first alignment process.

Hereinafter, a process of optimizing arrangement in which a weak identifier 101 for easily performing termination is located at the beginning portion will be described. The process of optimally arranging the weak identifier 101 in which many negative lines are located below the positive minimum value line at the beginning portion will be described with reference to the flowchart of FIG. 14 as the first realignment method.

In step S201, a sample learning image is prepared. A positive image and a negative image are prepared as the sample learning image. At this time, the identifier 100 is already generated. However, the positive image or the negative image used when the identifier 100 is generated may be prepared as the sample learning image.

In step S202, a score for each sample learning image of each weak identifier 101 configuring the identifier 100 is obtained. For example, if 100 weak identifiers 101-1 to 101-100 configure the identifier 100 so as to prepare 1000 sample learning images, the 1000 sample learning images are input to the weak identifiers 101-1 to 101-100 so as to calculate the score.

For example, the 1000 sample learning images are input to the weak identifier 101-1 so as to be processed such that 1000 scores of the weak identifier 101-1 for each sample learning image are calculated. That is, since f1(x) is calculated for each sample learning image, 1000 f1(x) exist. Similarly, other weak identifiers 101 have 1000 f(x). The 1000 scores include scores for the positive image and scores for the negative image. In a subsequent stage process, the scores of the negative image which are less than a minimum value of the scores when the positive image is processed may be counted and the numerical value thereof is regarded as a numerical value referred to when the weak identifier 101 is selected.

Similarly, 1000 scores are calculated with respect to each of the weak identifiers 101-2 to 101-100, the scores of the negative images which are less than a minimum value of the scores when the positive image is processed may be counted, and the numerical value thereof is regarded as a numerical value referred to when the weak identifier 101 is selected.

In step S203, initialization to i=0 is performed. i denotes a value indicating the number processed by the weak identifier 101. Accordingly, in step S203, initialization is performed and 0 is set. In step S204, a weak identifier 101 in which the number of negative images of a score lower than a lower limit value of the scores of the positive images is largest is selected from weak identifiers 101 which are not yet selected. In such selection, the above numerical value is referred to.

As described above, a minimum value of the scores when the positive image of the weak identifier 101-1 is processed is obtained and the number of negative images, the score of which is lower than the minimum value, may be counted. Next, a minimum value of the scores when the positive image of the weak identifier 101-2 is processed is obtained and the number of negative images, the score of which is lower than the minimum value, may be counted. Such a process, that is, a process of counting the number of negative images of a score less than a minimum score among scores when the positive image is processed, is sequentially performed up to the weak identifier 101-100. Accordingly, in this case, such a process is repeated 100 times.

As a result, in each weak identifier 101, if the number (the above-described numerical value) of negative images of a score less than a minimum score among scores when the positive image is processed is determined, a weak identifier 101 having a maximum value is selected from among the determined number. In this way, if one weak identifier 101 is selected, the value of i is increased by 1 and the process proceeds to step S205.

In step S205, it is determined whether i>number of weak identifiers. In other words, the process is finished with respect to all the weak identifiers 101 and a determination as to whether or not the optimization process (alignment process) is finished is made. In step S205, if it is determined that the process is not yet finished, the process returns to step S204 and the subsequent processes thereof are repeated.

The weak identifier 101 which is the object to be processed when the process returns to step S204 is a weak identifier 101 excluding the selected weak identifier 101. For example, in the case where 100 weak identifiers 101 are objects to be processed, if one is selected from among the 100 weak identifiers, the remaining 99 weak identifiers 101 are regarded as subsequent objects to be processed.

By repeating such a process, the operation order of the weak identifiers 101 configuring the identifier 100 is sequentially determined from the beginning portion. By repeating such a process, in the identifier 100 in which the weak identifiers 101 are realigned, since the weak identifier 101 for relatively easily performing termination is arranged in the beginning portion, the termination of the identifier 100 is early performed. Thus, it is possible to shorten the operation time of the identifier 100.

Figure 15:
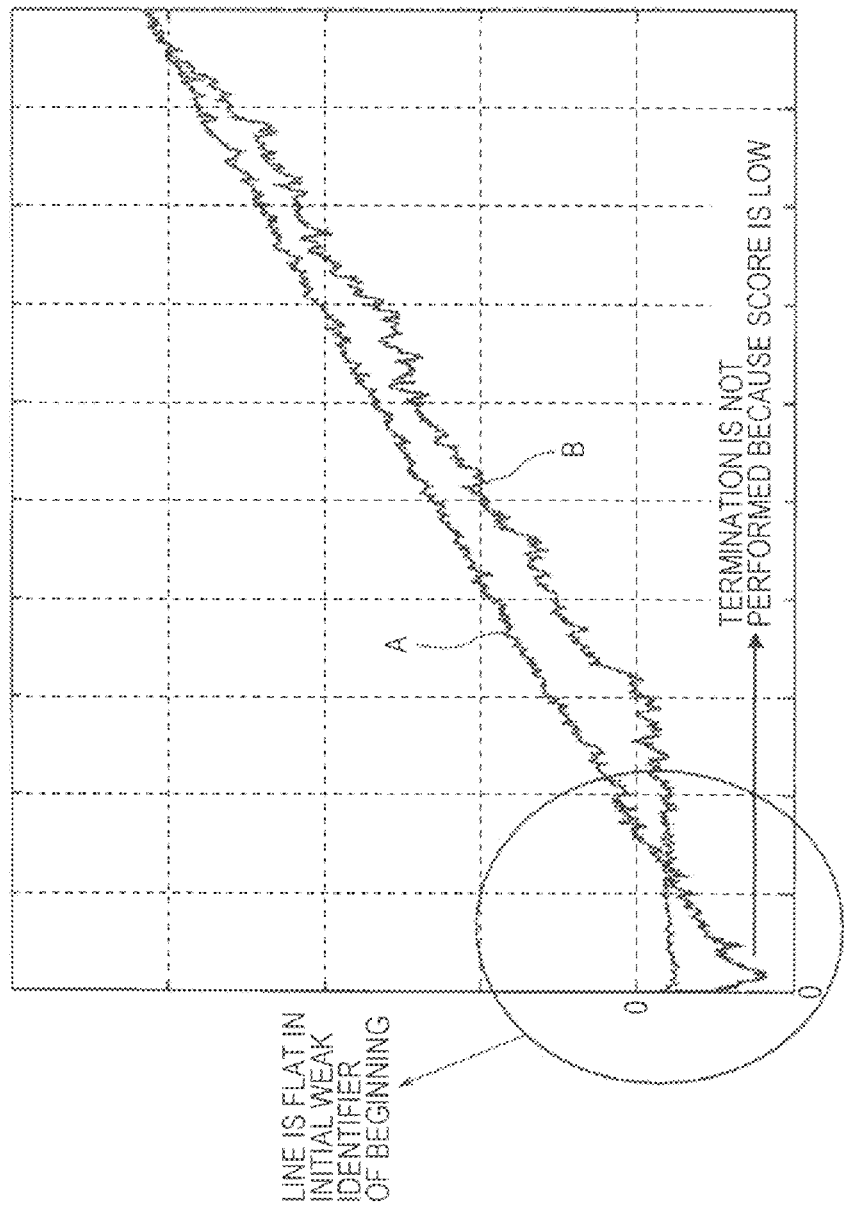
FIG. 15 is a diagram showing a verification result.

Here, a verification result of an identifier 100 before realignment and an identifier 100 after realignment will be described. FIG. 15 is a diagram showing a positive minimum value line (in the figure, a positive minimum value line A) of the identifier 100 before realignment and a positive minimum value line (in the figure, a positive minimum value line B) of the identifier 100 after realignment in the same graph.

In the graph shown in FIG. 15, a portion surrounded by a circle, that is, scores of a beginning portion among the weak identifiers 101 configuring the identifier 100, are compared. It can be seen from FIG. 15 that the positive minimum value line A has a low score at the beginning portion, and the positive minimum value line B has a high score and is flat at the beginning portion. If the score is low as in the positive minimum value line A, it can be seen that a probability that a score lower than that score is low. Accordingly, in the identifier 100 having the feature of the positive minimum value line A, a possibility that termination is performed by the weak identifier 101 arranged at the beginning portion is low.

Since the score of the beginning portion of the positive minimum value line B is higher than that of the positive minimum value line A, it can be seen that a possibility that a score lower than that score is calculated is high. Since the score is flat, if the score is accumulated (if the operations of the weak identifiers 101 are performed), it can be seen from FIG. 15 that a probability that the score falls below the positive minimum value line B is increased. Accordingly, it can be seen that a possibility that termination is performed earlier in the positive minimum value line B as compared to in the positive minimum value line A is high.

By realigning the weak identifiers 101 as described above, it is verified that it is possible to configure the identifier 100 in which termination is executed at an early stage.

The above-described realignment is an example of performing realignment based on the number of negative images (the number of negative lines) for outputting a score less than a minimum value which may be taken when the positive minimum value line, that is, the positive image, is processed. In this case, in a score less than a minimum value which may be taken when the positive image is processed, termination is performed using the negative image, instead of the positive image.

Alignment may be performed based on the number of positive images as a criteria (the number of positive lines) for outputting a score greater than a maximum value which may be taken when the negative maximum value line, that is, the negative image, is processed. In this case, in a score greater than a maximum value which may be taken when the negative image is processed, termination is performed using the positive image, instead of the negative image. In this way, the weak identifiers 101 may be realigned based on the maximum value as a criteria which may be taken when the negative image is processed.

Even in this case, since the weak identifiers 101 may be realigned by the same process as the above process, the description thereof will be omitted. However, this process is different from the above-described process in that a process of selecting a weak identifier 101 in which the number of positive images of a score greater than a maximum value of the negative image is increased is performed in step S204.

The realignment process based on the minimum value which may be taken when the positive image as a criteria is processed and the realignment process based on the maximum value which may be taken when the negative image as a criteria is processed may be simultaneously performed. In this case, the number of negative lines of a score less than a positive minimum value line is calculated, the number of positive lines of a score greater than a negative maximum value line is calculated, and weak identifiers are sequentially arranged from a weak identifier 101, the calculated number of which is a maximum.

Regarding another Realignment Process

Figure 16:
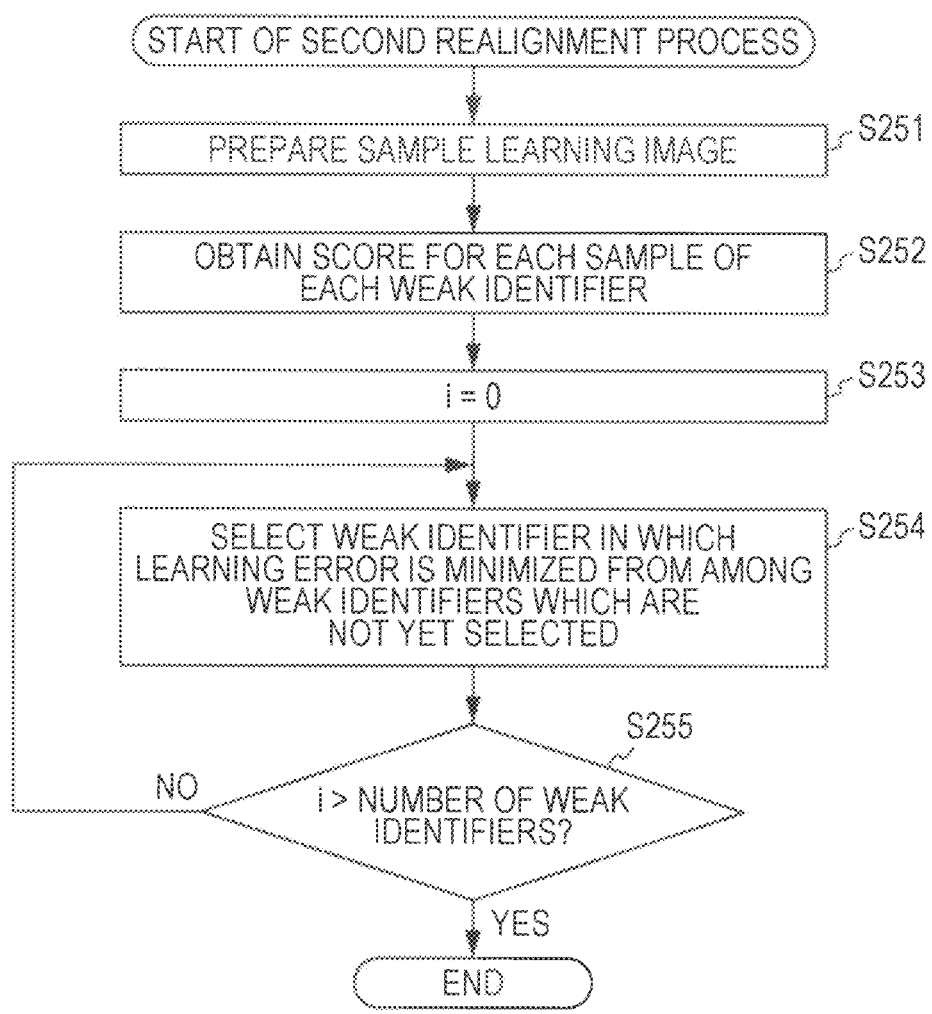
FIG. 16 is a flowchart describing a second realignment process.

Another realignment process (second realignment process) will be described. As described above, realignment considering the positive minimum value line or the negative maximum value line is not performed and realignment considering learning errors may be performed. The case of performing realignment considering learning errors will be described with reference to the flowchart shown in FIG. 16.

Sample learning images are prepared in step S251 and a score for each sample learning image of each weak identifier 101 is calculated in step S252. In step S253, i is initialized to 0. The processes of steps S251 to S253 are equal to the processes of steps S201 to S203 described with reference to the flowchart of FIG. 14 and the description thereof will be omitted.

In step S254, one weak identifier 101 in which learning errors are minimized is selected from among the weak identifiers 101 which are not yet selected. Small learning errors means that a possibility that an identifier result (score) of a negative image is output when a negative image is input and an identifier result (score) of a positive image is output when a positive image is input is high. Accordingly, the process of step S254 is performed such that such a weak identifier 101 is arranged at the beginning portion.

The learning error may be, for example, obtained as follows. The total number of sample learning images is N. The number of sample learning images which are erroneously determined as a negative image although a positive image is processed is A. In contrast, the number of sample learning images which are erroneously determined as a positive image although a negative image is processed is B. In this case, the learning error is (A+B)/N.

In step S254, if the weak identifier 101 in which the learning error is minimized is selected, i is increased by 1 and the process of step S255 is executed. In step S255, it is determined whether or not i is equal to or greater than the number of weak identifiers. If it is determined that i is not equal to or greater than the number of weak identifiers in step S255, the process returns to step S254 and the subsequent processes thereof are repeated.

In this way, by realigning the weak identifiers 101 in order of minimizing the learning error, it is possible to generate the identifier 100 in which termination may be performed at an early stage.

Regarding another Realignment Process

Although an example of performing realignment based on the score of each weak identifier 101 as a criteria is described in the above-described first realignment process and the second realignment process, next, an embodiment of performing realignment based on the score of the identifier 100 as a criteria will be described.

The above-described Equation 13 will be described again.

$$F(x) = f1(x) + f2(x) + f3(x) + \ldots + fn(X) \quad (13)$$

Although realignment is performed based on f1(x), f2(x), f3(x), ..., and fn(x) in Equation 13 as a criteria in the first realignment process and the second realignment process, the following realignment is based on F(x).

If the identifier 100 as a criteria in which termination is performed at an early stage is generated, all arrangements of the weak identifiers 101 are preferably tested and evaluated. For example, the average number of terminations is calculated for each arrangement of the weak identifiers 101 and an arrangement of the weak identifiers 101 in which the number of terminations is smallest is selected. However, for example, if all the arrangements of the 100 weak identifiers 101 are evaluated, 100×99×98×...×1 arrangements exist and evaluation of all arrangements is not efficient.

Therefore, as described below, a process of obtaining the same result when all arrangements are evaluated without evaluating all the arrangements of the weak identifiers 101 by applying a genetic algorithm will be described. The genetic algorithm prepares a plurality of "entities" expressing data (a candidate of a solution) by a gene, preferentially selects an entity having high adaptability, and searches for a solution while repeating a manipulation of crossing (realignment) and mutation.

In the genetic algorithm, mainly, a genetic manipulation such as selection (selection, reproduction), crossing (realignment), or mutation is used. The "selection" is to model natural selection of a living object and is a manipulation for increasing or deleting entities according to adaptability. The "crossbreeding (realignment)" is to model leaving of offspring by crossbreeding living objects and is an operation for permuting a part of a gene of an entity. The "mutation" is to model mutation of a gene of a living object and is an operation for changing a part of a gene of an entity.

The process of the case of performing arrangement of the weak identifiers 101 by applying the genetic algorithm will be described with reference to the flowchart of FIG. 17. In step S301, an initial index column is generated. Here, the description will be continuously given on the assumption that 100 indexes are generated. The index is an identifier 100 in which the arrangement of the weak identifiers 101 is different. That is, here, identifiers 100-1 to 100-100 in which the arrangement of the weak identifiers 101 is different are generated.

One of the 100 identifiers 100 is an identifier 100 generated as a result of performing a learning process. This identifier 100 is an identifier 100 before realignment of the weak identifier 101. The remaining 99 identifiers are identifiers 100 which are randomly generated. The identifiers 100 which are randomly generated are identifiers 100 in which the arrangement of the weak identifiers 101 is different. In addition, as one of the remaining 99 weak identifiers 101, the identifier 100 subjected to the realignment of the weak identifiers 100 in the above process may be included.

The 100 identifiers 100 generated in the way are treated as entities of a current generation. In step S302, each entity (each identifier 100) is evaluated. Here, the same sample learning image is processed in each identifier 100 and evaluation is performed by the number of average termination weak identifiers 101 of the operation. As the number of average termination weak identifiers 101 is decreased, the better the evaluation that may be obtained. Sorting is performed in order from a small number.

In step S303, "selection" which is the genetic operation of the genetic algorithm is executed. In step S303, an elite is selected. Here, the elite is an identifier 100 in which the number of terminations is small (an identifier 100 in which termination is performed at an early stage). Since sorting is performed in order from the smallest number of terminations by the evaluation of step S302, higher Ne identifiers are selected. Here, the description will be continuously given on the assumption that Ne is 10.

In step S304, a selection probability p is obtained. The selection probability p is, for example, a value used because an entity which is an object to be processed (in this case, an identifier 100) is selected when performing crossing in the next step S305, but an entity which is easily selected and an entity which is not easily selected are provided during the selection. The selection probability p is calculated based on Equation 14.

$$p = \frac{\sum \frac{1}{\text{rank}}}{\sum \frac{1}{\text{rank}}} \quad (14)$$

In Equation 14, the rank denotes a value attached in a sorted order (in order from the smallest number of terminations) and ranks 1, 2, ..., and 100 are attached in order from the smallest number of terminations. Accordingly, in Equation 14, the selection probability p of the identifier 100 in which the number of terminations is small (the rank is high) is large and this identifier is an identifier 100 which is easily selected.

In step S305, "crossing" which is the genetic operation of the genetic algorithm is executed. Crossing is performed by crossing Nc sets selected by the selection probability P. Here, the description will be continuously given on the assumption that Nc sets are 30 sets. Since 30 sets of identifiers 100 are selected, 60 identifiers 100 (entities) are selected. If 60 identifiers 100 (parent identifiers 100) are selected and crossed, 60 identifiers 100 (child identifiers 100) are generated.

The identifier 100 includes a plurality of weak identifiers 101 (here, 100 weak identifiers 101), but such weak identifiers 101 are different weak identifiers 101. As a crossing result, it is not preferable that the same weak identifiers 101 are included in the generated identifier 100. Accordingly, it is necessary to perform crossing such that the same weak identifiers 101 are not included in the same identifier 100.

Here, an example of crossing, an Order Based Crossover method is applied. Here, the Order Based Crossover method will be described with reference to FIGS. 18A to 18D. As shown in FIG. 18A, it is assumed that a parent 1 and a parent 2 exist and the parent 1 and the parent 2 are crossed so as to generate a child 1 and a child 2. As shown in FIG. 18A, the parent 1 has arrangement "25036147" and the parent 2 has arrangement "34072516".

First, several genes are randomly selected from the parent 1. Here, it is assumed that three genes are selected. As shown in FIG. 18A, "5", "0" and "1", are selected as the genes. Next, as shown in FIG. 18B, the genes selected from the parent 1 are excluded from the parent 2 and the parent 2 from which the genes are excluded is given to the child 1. At this time, the child 1 has arrangement "34\*72\*\*6". \* denotes a non-defined gene.

Next, as shown in FIG. 18C, the genes selected from the parent 1 are sequentially allocated to the child 1 while maintaining the order of genes. If the order of genes selected from the parent 1 is maintained, the order is "5", "0" and "1". Accordingly, since "5", "0", and "1" are sequentially allocated to \* portion of "34\*72\*\*6" of the child 1 in this order, the child 1 has arrangement "34572016". In this way, the child 1 is generated.

By performing the same process, the child 2 shown in FIG. 18D is generated. The child 2 has an arrangement "24036157". By performing crossing by such a process, it is possible to execute crossing while the same genes do not exist in the same child. By performing crossing by such a process, it is possible to perform crossing in which the same weak identifiers 101 do not exist in the same identifier 100.

Figure 17:
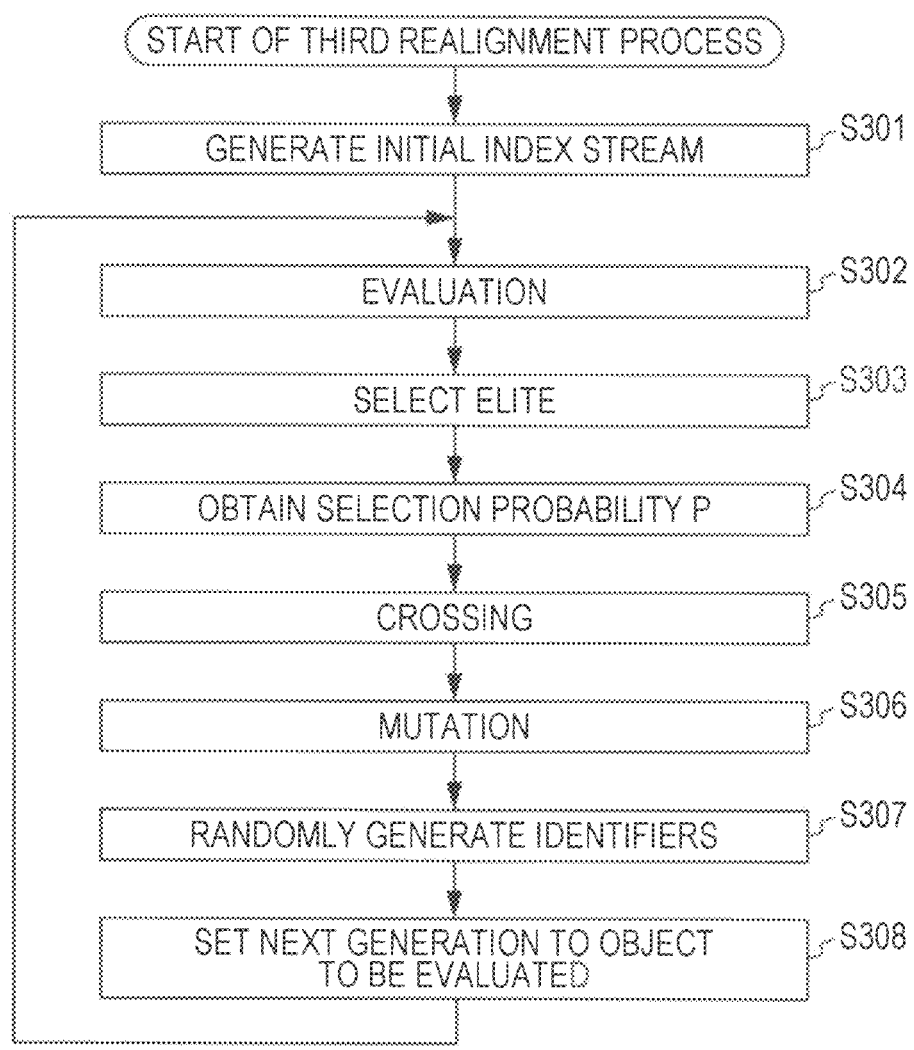
FIG. 17 is a flowchart describing a third realignment process.

Returning to the description of the flowchart of FIG. 17, in step S306, the "mutation" which is the genetic operation of the genetic algorithm is executed. The mutation is performed by mutating Nm identifiers selected by the selection probability p. Here, the description will be continuously given on the assumption that Nm is 20. The mutation is, for example, performed by randomly permuting several weak identifiers by a predetermined probability. For example, two weak identifiers 101 are randomly permuted by 2.5% such that the identifier 100 after mutation is generated.

In step S307, Nr identifiers 100 are randomly generated. In step S307, Nr identifiers 100 having an index stream different from the initial index stream (in this case, 100 identifiers 100) generated in step S301 are generated. Here, the description will be continuously given on the assumption that Nr is 10.

In step S308, a next generation becomes an object to be evaluated and the process after step S302 is repeated. The next generation includes the 10 identifiers 100 selected in step S303, the 60 identifiers 100 generated by crossing in step S305, the 20 identifiers 100 generated by mutation in step S306, and the 10 identifiers 100 generated randomly in step S307. That is, the next-generation entity includes a total of 100 identifiers.

The process of generating 100 next-generation identifiers 100 from the current-generation 100 identifiers 100 and regarding the generated 100 next-generation identifiers 100 as new current-generation identifiers 100 is repeated. By repeating such a process, when it is determined that the result converges, the third realignment process shown in FIG. 17 is finished. The determination that the result converges is, for example, a time when the number of identifiers 100 in which the number of terminations is smallest is not changed as the evaluation result of step S302.

In this way, if the identifier 100 is generated by applying the genetic algorithm, by evaluating all the realignments of the weak identifiers 101 configuring the identifier 100, it is possible to generate the identifier 100 with the same accuracy as when a best identifier 100 is found. However, by evaluating all the arrangements of the weak identifiers 101 configuring the identifier 100, it is possible to efficiently generate the identifier 100 unlike the case where a best identifier 100 is found.

In addition, the above-described numbers, for example, Ne, Nc, Nm, or Nr are exemplary and the invention is not limited thereto or a ratio of such numbers.

The above-described first realignment process, second realignment process, and third realignment process are performed with the generated identifier 100 as the learning result of the learning device 11 (FIG. 1). Accordingly, the first to third realignment processes are processes performed for optimizing the identifier 100 generated once and may be performed by the learning device 11. Alternatively, the first to third realignment processes are processes performed for optimizing the existing identifier 100 by the recognition device 13 and may be performed by the recognition device 13.

Regarding Recognition Process

Figure 19:
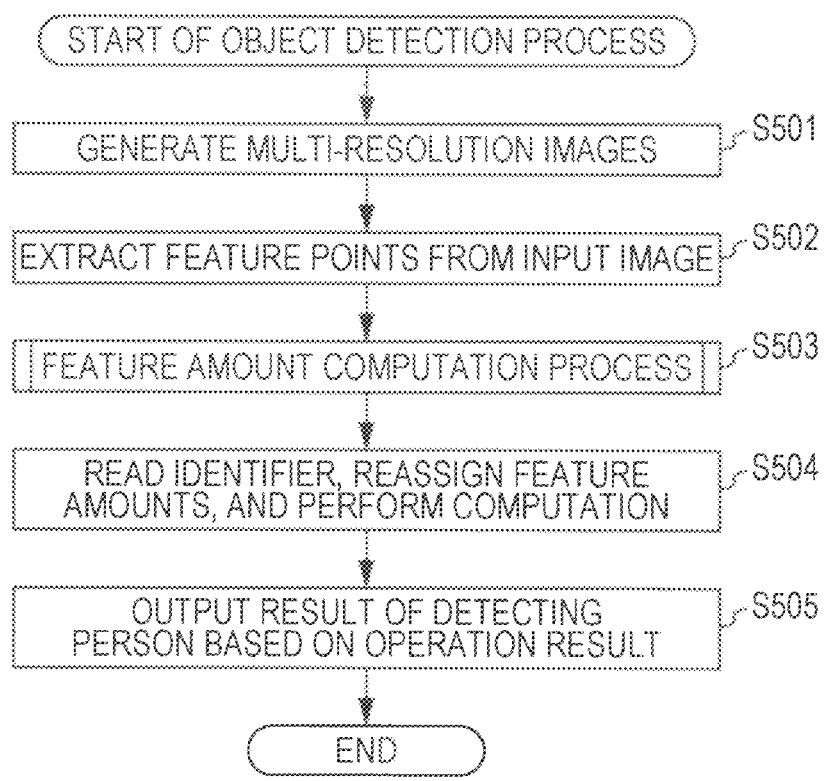
FIG. 19 is a flowchart describing a recognition process.

Next, a process of detecting (recognizing), for example, a target object such as a person using a learning result will be described. If an input image is input to the recognition device 13 so as to instruct detection of a person, the recognition device 13 starts a person detection process and detects a target object from the input image. Hereinafter, the person detection process using the recognition device 13 will be described with reference to the flowchart of FIG. 19.

In addition, the image input unit 31 to the feature amount computation unit 34 of the recognition device 13 may have the same configuration as the image input unit 21 to the feature amount computation unit 24 of the learning device 11. Accordingly, the description of the image input unit 21 to the feature amount computation unit 24 of the learning device 11 or the description of the filter or the like is applicable to the recognition device 13 and is the same description and thus the detailed description thereof will be omitted.

In step S501, if an image to be recognized is input to the image input unit 31 (FIG. 1) of the recognition device 13 and supplied to the multi-resolution image generation unit 32, the multi-resolution images are generated by the multi-resolution image generation unit 32. Since this process is performed similarly to the process of step S11 (FIG. 5) and the detailed description thereof is given above, the description thereof will be omitted.

In addition, when the multi-resolution images are generated by the multi-resolution image generation unit 32, images having scales (resolutions) equal to those of the multi-resolution images generated by the multi-resolution image generation unit 22 of the learning device 11 are generated. By adjusting a scale coefficient (information about resolution) during learning and a scale coefficient during recognition, it is possible to efficiently perform scanning during recognition.

In step S502, the feature point extraction unit 33 performs the same as the process of step S12 of FIG. 5, extracts feature points from the input image, and supplies the feature points to the feature amount computation unit 34 along with the input image. Accordingly, the positions or the number of extracted feature points are varied depending on which filter is used. An image suitable for the filter is applicable to the applied multi-resolution images.

In step S503, the feature amount computation unit 34 performs a feature amount computation process based on the input image and the feature points from the feature point extraction unit 33 and computes the feature amounts of the feature points. The feature amount computation unit 34 supplies the obtained feature amounts to the identification computation unit 35. In addition, this feature amount computation process is equal to the feature amount computation process described with reference to FIG. 6 and thus the description thereof will be omitted.

In step S504, the identification computation unit 35 reads an identification feature amount and an identifier from the identifier recording unit 12 and assigns the feature amounts to the read identifiers so as to perform computation. That is, the identification computation unit 35 assigns that corresponding to the identification feature amount among the feature amounts from the feature amount computation unit 34 to the identifier shown by Equation 7 or Equation 8 so as to perform the operation.

Here, the feature amount assigned to the weak identifiers configuring the identifier is obtained from a pair of feature points or feature points on the input image located at the same positions as a pair of feature points or feature points of a learning image, in which the feature amount regarded as the identification feature amount is obtained. The feature amount regarded as the identification feature amount is used to set the weak identifiers configuring the identifier during a statistical learning process.

For example, if the operation of Equation 7 is performed, as the operation result, "+1" indicating that a person exists in the input image as a target object or "−1" indicating that a person does not exist in the input image as a target object are obtained. The identification computation unit 35 supplies the operation result of the identifier to the identification result output unit 36.

In step S505, the identification result output unit 36 outputs the result of detecting the object (person) based on the operation result from the identification computation unit 35 and finishes the object detection process. That is, an identification result indicating whether or not the target object is recognized in the input image is output.

For example, as the identification result indicating whether or not the target object is recognized in the input image, an input image or the like in which a frame is displayed in a region in which the person is detected as the target object may be displayed on the identification result output unit 36.

In this way, the recognition device 13 extracts the feature points from the input image so as to obtain feature amounts of the pair of feature points and extracts the feature points from the input image so as to obtain feature amounts. The recognition device 13 detects the target object from the input image using the obtained feature amounts and the feature amounts and identifier recorded in the identifier recording unit 12.

In this way, by detecting the target object from the input image using the feature amounts, it is possible to more reliably detect the target object from the image.

Regarding Recording Medium

The above-described series of processes may be executed by hardware or software. If the series of processes are executed by software, a program configuring the software is installed in a computer. The computer includes a computer assembled in dedicated hardware or, for example, a general-purpose personal computer capable of executing a variety of functions by installing various programs, or the like.

Figure 20:
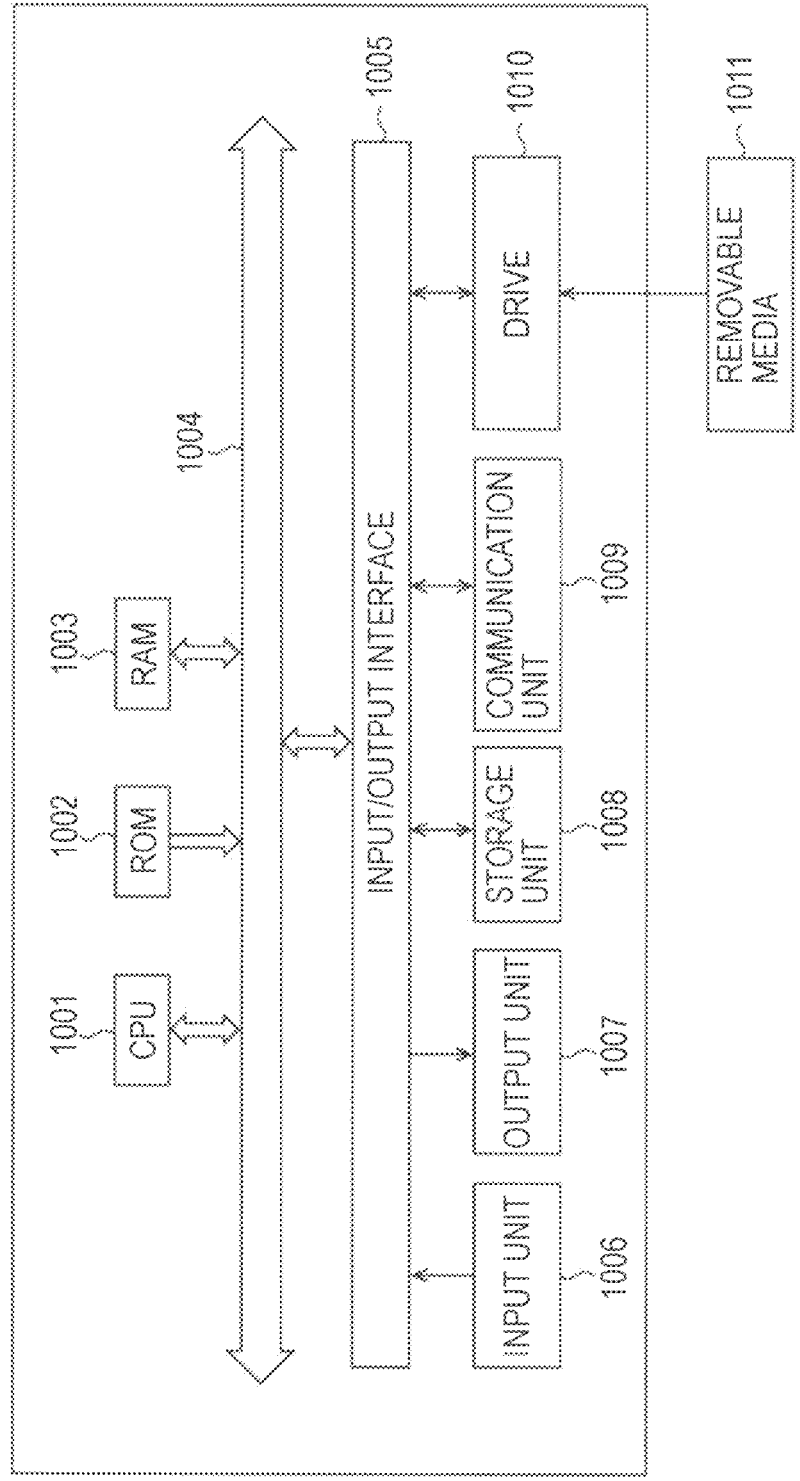
FIG. 20 is a diagram describing a recording medium.

FIG. 20 is a block diagram showing a configuration example of hardware of a computer for executing the above-described series of processes by a program. In the computer, a Central Processing Unit (CPU) 1001, a Read Only Memory (ROM) 1002, and a Random Access Memory (RAM) 1003 are connected to each other by a bus 1004. An input/output interface 1005 is connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives removable media 1011 such as a magnetic disk, an optical disc, a magneto-optical disc, or a semiconductor memory.

In the computer having the above configuration, the CPU 1001 loads, for example, the program stored in the storage unit 1008 to the RAM 1003 through the input/output interface 1005 and the bus 1004 so as to perform the above-described series of processes.

The program executed by the computer (CPU 1001) may be recorded, for example, in the removable media 1011 as package media or the like so as to be provided. The program may be provided through a wired or wireless transmission medium such as a local area network, the Internet, or a digital satellite broadcast.

In the computer, the program may be installed in the storage unit 1008 through the input/output interface 1005 by mounting the removable media 1011 in the drive 1010. The program may be received using the communication unit 1009 through a wired or wireless transmission medium and installed in the storage unit 1008. The program may be installed in the ROM 1002 or the storage unit 1008 in advance.

The program executed by the computer may be a program which is performed in time series in the order described in the present specification or a program which is processed in parallel or at necessary timings such as when calling is performed.

In the present specification, the system indicates an overall device including a plurality of devices.

The embodiments of the invention are not limited to the above-described embodiments and various modifications may be made without departing from the scope of the invention.

The present application contains subject matter related to that disclosed in Japanese Priority Patent Application JP 2010-129332 filed in the Japan Patent Office on Jun. 4, 2010, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing device comprising:
    means for calculating a score of each of a plurality of sample images for each weak identifier of an identifier including a set of weak identifiers, the plurality of sample images including at least one positive image in which an object as an identification object is present and at least one negative image in which the object as the identification object is not present;
    means for calculating a number of scores when the negative image is processed, which are scores less than a minimum score among scores when the positive image is processed for each of the weak identifiers; and
    means for realigning the set of weak identifiers in order from a weak identifier in which the number of scores calculated by the means for calculating the number of scores is a maximum, the realigned set of weak identifiers being sequentially added during an operation of the identifier until the sequentially added values become equal to or less than a predetermined threshold.

2. An information processing method of an information processing apparatus, the method comprising the steps of:
    calculating, by circuitry of the information processing apparatus, a score of each of a plurality of sample images for each weak identifier of an identifier including a set of weak identifiers, the plurality of sample images including at least one positive image in which an object as an identification object is present and at least one negative image in which the object as the identification object is not present;
    calculating a number of scores when the negative image is processed, which are scores less than a minimum score among scores when the positive image is processed for each of the weak identifiers; and
    aligning, by the circuitry of the information processing apparatus, the set of weak identifiers in order from a weak identifier in which the calculated number of scores is a maximum, the set of realigned weak identifiers being sequentially added during an operation of the identifier until the sequentially added values become equal to or less than a predetermined threshold.

3. A non-transitory computer-readable storage medium storing a program which, when executed by a computer, causes the computer to perform a process comprising the steps of:
    calculating a score of each of a plurality of sample images for each weak identifier of an identifier including a set of weak identifiers, the plurality of sample images including at least one positive image in which an object as an identification object is present and at least one negative image in which the object as the identification object is not present;
    calculating a number of scores when the negative image is processed, which are scores less than a minimum score among scores when the positive image is processed for each of the weak identifiers; and
    realigning the set of weak identifiers in order from a weak identifier in which the calculated number of scores is a maximum, the realigned set of weak identifiers being sequentially added during an operation of the identifier until the sequentially added values become equal to or less than a predetermined threshold.

4. An information processing device comprising:
    circuitry configured to
        calculate a score of each of a plurality of sample images for each weak identifier of an identifier including a set of weak identifiers, the plurality of sample images including at least one positive image in which an object as an identification object is present and at least one negative image in which the object as the identification object is not present;
        calculate a number of scores when the negative image is processed, which are scores less than a minimum score among scores when the positive image is processed for each of the weak identifiers; and
        realign the set of weak identifiers in order from a weak identifier in which the calculated number of scores is a maximum, the realigned set of weak identifiers being sequentially added during an operation of the identifier until the sequentially added values become equal to or less than a predetermined threshold.

* * * * *